(12) United States Patent
Yilmaz et al.

(10) Patent No.: US 9,260,313 B2
(45) Date of Patent: Feb. 16, 2016

(54) PROCESS FOR THE PREPARATION OF PILLARED SILICATES

(75) Inventors: Bilge Yilmaz, New York, NY (US); Ulrich Müller, Neustadt (DE); Feng-Shou Xiao, Changchun (CN); Hermann Gies, Sprockhövel (DE); Takashi Tatsumi, Kawasaki (JP); Dirk de Vos, Holsbeek (BE); Xinhe Bao, Dalian (CN); Weiping Zhang, Dalian (CN)

(73) Assignees: BASF SE, Ludwigshafen (DE); Tokyo Institute of Technology, Tokyo (JP)

( * ) Notice: Subject to any disclaimer, the term of this patent is extended or adjusted under 35 U.S.C. 154(b) by 421 days.

(21) Appl. No.: 13/254,032

(22) PCT Filed: Mar. 3, 2010

(86) PCT No.: PCT/EP2010/052695
§ 371 (c)(1),
(2), (4) Date: Aug. 31, 2011

(87) PCT Pub. No.: WO2010/100191
PCT Pub. Date: Sep. 10, 2010

(65) Prior Publication Data
US 2011/0319250 A1 Dec. 29, 2011

(30) Foreign Application Priority Data
Mar. 3, 2009 (WO) .................. PCT/CN2009/070617

(51) Int. Cl.
*B01J 29/04* (2006.01)
*C01B 39/00* (2006.01)
(Continued)

(52) U.S. Cl.
CPC .............. *C01B 37/005* (2013.01); *C01B 31/02* (2013.01); *C01B 37/02* (2013.01); *C01B 39/026* (2013.01);
(Continued)

(58) Field of Classification Search
CPC .... C01B 37/005; C01B 37/02; C01B 39/026; C04B 35/16
USPC .............................. 423/263, 700, 701; 502/60
See application file for complete search history.

(56) References Cited

U.S. PATENT DOCUMENTS

| 5,200,058 A | 4/1993 | Beck et al. |
| 7,973,183 B2 | 7/2011 | Goebbel et al. |

(Continued)

FOREIGN PATENT DOCUMENTS

| CN | 1275134 | 11/2000 |
| CN | 1997591 | 7/2007 |

(Continued)

OTHER PUBLICATIONS

Kimura et al, Organic modicitiaon of FSM-type mesoporous silicas dervied from Kanemite by Silylation, Langmuir 1999, 15, 2794-2798.*

(Continued)

*Primary Examiner* — Jun Li

(57) ABSTRACT

The present invention relates to a process for the preparation of a silicate compound, comprising (1) providing at least one layered silicate; and (2) mixing said layered silicate with water and at least one silicon containing compound according to formula $R_{4-m}Si[—(SiR_2)_n—R]_m$ wherein at least one residue R is a leaving group and none of the residues R contains Si; m is 0, 1, 2, 3, or 4; and n is an integer greater than or equal to 0.

15 Claims, 26 Drawing Sheets

(51) Int. Cl.

| | |
|---|---|
| *C04B 35/622* | (2006.01) |
| *C01B 37/00* | (2006.01) |
| *C01B 31/02* | (2006.01) |
| *C01B 37/02* | (2006.01) |
| *C01B 39/02* | (2006.01) |
| *C01B 39/46* | (2006.01) |
| *C01B 39/48* | (2006.01) |
| *C04B 35/16* | (2006.01) |

(52) U.S. Cl.
CPC ............... *C01B 39/46* (2013.01); *C01B 39/48* (2013.01); *C04B 35/16* (2013.01); *C04B 2235/3201* (2013.01); *C04B 2235/3222* (2013.01); *C04B 2235/3427* (2013.01); *C04B 2235/5409* (2013.01)

(56) References Cited

U.S. PATENT DOCUMENTS

| | | | |
|---|---|---|---|
| 2008/0000354 A1 | 1/2008 | Muller et al. | |
| 2008/0253953 A1* | 10/2008 | Muller et al. | 423/325 |
| 2009/0197426 A1* | 8/2009 | Abrevaya | C01B 39/026 438/778 |
| 2009/0247655 A1* | 10/2009 | Kim et al. | 521/64 |
| 2010/0076220 A1 | 3/2010 | Schubert et al. | |
| 2010/0119442 A1 | 5/2010 | Mueller et al. | |
| 2010/0154635 A1 | 6/2010 | Schubert et al. | |
| 2010/0191000 A1 | 7/2010 | Melder et al. | |
| 2010/0197990 A1 | 8/2010 | Schubert et al. | |
| 2011/0011805 A1 | 1/2011 | Schubert et al. | |
| 2011/0076229 A1 | 3/2011 | Trukhan et al. | |
| 2011/0112343 A1 | 5/2011 | Leung et al. | |
| 2011/0118526 A1 | 5/2011 | Schubert et al. | |
| 2011/0124933 A1 | 5/2011 | Kiesslich et al. | |
| 2011/0178335 A1 | 7/2011 | Leung et al. | |
| 2011/0197762 A1 | 8/2011 | Voss et al. | |

FOREIGN PATENT DOCUMENTS

| | | |
|---|---|---|
| CN | 101230210 | 7/2008 |
| EP | 1026176 | 8/2000 |
| JP | 2003-020304 | 1/2003 |
| WO | WO-92/21612 | 12/1992 |
| WO | WO-2005/100242 | 10/2005 |
| WO | WO-2007/042531 | 4/2007 |
| WO | WO-2008/122579 | 10/2008 |
| WO | WO-2008/129024 | 10/2008 |
| WO | WO-2009/059941 | 5/2009 |
| WO | WO-2009/059944 | 5/2009 |
| WO | WO-2009/124902 | 10/2009 |
| WO | WO-2010/081797 | 7/2010 |
| WO | WO-2010/099650 | 9/2010 |
| WO | WO-2010/099651 | 9/2010 |
| WO | WO-2010/099652 | 9/2010 |
| WO | WO-2010/100191 | 9/2010 |

OTHER PUBLICATIONS

Macedo et al, New inorganic-organic lamellar derivatives synthesized from H-RUB-18 and thermodynamics of cation sorption, New. J. Chem. 2009, 33:2081-2089.*
"Machine Translation of WO 2010/081797", Jul. 22, 2010, 14 pages.
"Machine Translation of WO2008/129024", Oct. 30, 2008, 24 pages.
"Machine Translation of WO2009/059941", May 14, 2009, 10 pages.
"Machine Translation of WO2009/059944", May 14, 2009, 10 pages.
"Machine Translation of WO2009/124902", Oct. 15, 2009, 18 pages.
"Machine Translation of WO92/21612", Dec. 10, 1992, 18 pages.
"PCT International Search Report for PCT/EP2010/052695", Sep. 10, 2010, 6 pages.
Mochizuki, Dai et al., "Molecular Manipulation of Two- and Three-Dimensional Silica Nanostructures by Alkoxysilylation of a Layered Silicate Octosilicate and Subsequent Hydrolysis of Alkoxy Groups", *Journal of the American Chemical Society*, vol. 127 2005, 7183-7191.
Oberhagemann, Uwe et al., "A Layer Silicate: Synthesis and Structure of the Zeolite Precursor RUB-15", *Angew. Chem. Int. Ed. Engl.* 1996, 35, No. 23/24 1996, 2869-2872.
Song, J. et al., "Zeolites Synthesis in the System $N(CH_3)(C_2H_5)_3F$—$SiO_2$—$H_2O$", *Studies in Surface Science and Catalysis*, vol. 154 2004, 295-300.
Wang, Y.X. et al., "Crystal Structure of the New Layer Silicate RUB-39 and Its Topotactic Condensation to a Microporous Zeolite with Framework Type RRO", *American Chemical Society*, vol. 19, No. 17 Jul. 21, 2007, 4181-4188.
Wu, Peng et al., "Methodology for Synthesizing Crystalline Metallosilicates with Expanded Pore Windows Through Molecular Alkoxysilylation of Zeolitic Lamellar Precursors", *J. Am. Chem. Soc.* Jun. 4, 2008, 8178-8187.
Wu, Peng et al., "Methodology for Synthesizing Crystalline Metallosilicates with Expanded Pore Windows Through Molecular Alkoxysilylation of Zeolitic Lamellar Precursors", *J. Am. Chem. Soc*, vol. 130, No. 26 2006, 10 pgs.

* cited by examiner

PROCESS FOR THE PREPARATION OF PILLARED SILICATES

CROSS-REFERENCE TO RELATED APPLICATIONS

This application is the National Stage entry of PCT/EP2010/052695, filed on Mar. 3, 2010, which claims priority to International Patent application number PCT/CN2009/070617, filed on Mar. 3, 2009, both of which are incorporated herein by reference in their entireties.

BACKGROUND

In the field of catalysis, and also, for example, in the field of adsorption or absorption processes, providing novel framework topologies with novel pore architectures plays a crucial role in the development of catalysts, catalyst components, and catalyst support materials displaying novel reactivity and/or improved performance. For example, the condensation of layered silicates into new zeolitic frameworks via topotactic procedures has been investigated in the past.

This synthesis and characterisation of products resulting from the reaction of selected layered silicates having the MWW, FER, CDO, and MCM-47 topologies with diethoxydimethylsilane is disclosed in P. Wu et al.; J. Am. Chem. Soc., 130, 2008, pp. 8178-8187. In particular, the silylation products described therein are obtained by refluxing the specific layered silicate precursors in 2M HNO$_3$, followed by a calcination procedure.

The silylation procedures of the prior art, however, are only limited to a very narrow range of silicate topologies.

SUMMARY

According to one or more embodiments, provided is a process for the preparation of a silicate compound, in particular to the preparation of a pillared layered silicate. In certain embodiments, the present invention also relates to silicates obtainable by this process, in particular to calcined silicates and moldings thereof. Further embodiments relate to these silicates per se and to their use.

DETAILED DESCRIPTION

It is therefore an object of the present invention to provide a novel process for the preparation of silylated layered silicates, i.e. pillared layered silicates.

A further object of the present invention is to provide novel zeolitic frameworks with expanded pore openings which are thermally stable, in particular to layered structures with wider interlayer pore openings.

It is furthermore an object of the present invention to provide compounds which can be used as molecular sieves and/or adsorbents for such isolations and/or separations.

A further object of the present invention consists in providing compounds which may be used as catalysts and/or catalyst supports.

According to the present invention it has been found among others that, as opposed to the silylation examples of specific silicate topologies of the prior art, silylation of the RUB-15, RUB-36 and RUB-39 structures is possible, thus affording novel materials with unexpected properties. In addition to this, it has been found that a novel process making use of specific silylating agents leading to novel layered materials may also be used in the present invention, thus leading to further novel pillared silicates displaying unexpected and novel properties.

In particular, according to the present invention it has been found that the use of hydrothermal conditions in a silylation process allows for the silylation of layered silicates in a simple and versatile procedure.

Furthermore, a process for the preparation of novel layered silicates has been found which may be used as precursor layered silicate structures for the preparation of novel pillared silicates, in particular with the aid of hydrothermal conditions for the silylation process.

Most unexpectedly, however, it has been found that the use of trialkylsilanes and silanes comprising trialkylsilane moieties, in particular hexaalkylsilanes, also leads to pillared silicate products. This is particularly surprising since the presence of three alkyl groups in the silane moieties is expected to only allow for the monosilylation of the layered silicate precursors, thus preventing the formation of silane bridges present in the pillared silicate products.

Therefore, the present invention relates to a process for the preparation of a silicate compound, comprising
(1) providing at least one layered silicate;
(2) mixing said layered silicate with water and at least one silicon containing compound according to formula (I)

$$R_{4-m}Si[\!\!-\!\!(SiR_2)_n\!\!-\!\!R]_m \qquad (I)$$

wherein
m is 1, 2, 3, or 4; and
n is an integer greater than or equal to 0;
wherein when n is equal to 0, at least one residue R is a leaving group, and
wherein none of the residues R contains Si.

According to the present invention, a layered silicate is provided in step (1). The layered silicate provided in (1) can be any conceivable silicate displaying a layered structure, provided that it comprises chemical functionalities which under suitably chosen reaction conditions may react with the a least one silicon containing compound according to formula (I). In particular, layered silicates are characterized in that in their X-ray diffraction pattern they display one or more intense reflections, preferably one intense reflection, at low diffraction angles.

In preferred embodiments of the present invention, the at least one layered silicate provided in (1) is an isomorphously substituted layered silicate. Generally, all elements may be contained in the layered silicates, isomorphously substituting at least a portion of the Si atoms in the layered silicate which are suitable for such isomorphous substitution. Preferred suitable elements according to the present invention are selected from the group consisting of Al, B, Fe, Ti, Sn, Ga, Ge, Zr, V, Nb, and a mixture of two or more thereof. In a particular embodiment of the present invention, for example in the case that layered silicates are employed having the structure as disclosed in P. Wu et al.; J. Am. Chem. Soc., 130, 2008, pp. 8178-8187, the at least one additional element in the layered silicate provided in (1) is not Ti, B, Al, Ga, or Fe.

In the present invention, the layered silicate provided in (1) is preferably selected from the group consisting of RUB-15, RUB-36, RUB-39, BLS-1, and BLS-3. However, in particular as far a preferred embodiment of the present invention is concerned according to which index n in formula (I) is greater than or equal to 1, also other layered silicates may be mentioned as preferred starting materials, such as, for example, the materials mentioned in the introductory part of the present invention.

In particularly preferred embodiments, the layered silicate provided in (1) is selected from the group consisting of RUB-15, RUB-36, BLS-1, and BLS-3 or, alternatively, RUB-15, RUB-39, BLS-1, and BLS-3 or, alternatively, RUB-36, RUB-39, BLS-1, and BLS-3. More preferably, the layered silicate is selected from the group consisting of RUB-15, BLS-1, and BLS-3 or, alternatively, RUB-39, BLS-1, and BLS-3 or, alternatively, RUB-36, BLS-1, and BLS-3. Most particularly preferred are embodiments wherein the layered silicate is BLS-1 and/or BLS-3.

Preferred Layered Silicates

RUB-36

Layered silicates of structure type RUB-36 are known in the art. For example, reference is made to the all-silica RUB-36 layered silicate, consisting of Si and O, described in J. Song, H. Gies; Studies in Surface Science and Catalysis, volume 15, 2004, pp. 295-300. According to the present invention, the RUB-36 layered silicate is preferably defined as a compound having an X-ray diffraction pattern comprising at least the following reflections:

| Diffraction angle 2θ/° [Cu K(alpha 1)] | Intensity (%) |
|---|---|
| 7.85-8.05 | 100.0 |
| 17.04-17.24 | 1.6-5.6 |
| 20.26-20.46 | 1.7-5.7 |
| 23.89-24.09 | 4.2-12.2 |
| 24.73-24.93 | 4.8-12.8 |
| 25.30-25.50 | 2.6-6.6 |
| 26.52-26.72 | 0.7-4.7 | wherein 100% relates to the intensity of the maximum peak in the X-ray diffraction pattern.

In particularly preferred embodiments, the RUB-36 precursor is a layered silicate obtained according to Example 1, or obtainable by any other conceivable procedure which yields the same or substantially the same layered silicate or any isomorphous derivative thereof.

As far as isomorphously substituted RUB-36 silicates are concerned, particularly preferred silicates contain, as substituting elements, at least one element selected from the group consisting of Al, B, Fe, Ti, Sn, Ga, Ge, Zr, V, Nb, and a mixture of two or more thereof. These silicates contain not only Si atoms in the silicate structure, but also, as isomorphous substitution of at least a portion of the Si atoms in the silicate structure, at least one of the suitable elements. Such isomorphously substituted RUB-36 silicates may be prepared, for example, by a process for the preparation of an isomorphously substituted RUB-36 layered silicate comprising (1) providing a mixture containing silica, preferably amorphous silica, and/or at least one silica precursor, water, at least one tetraalkylammonium compound selected from the group consisting of a diethyldimethylammonium compound, a triethylmethylammonium compound, and a mixture of a diethyldimethylammonium and a triethylmethylammonium compound, optionally at least one base, (2) heating the mixture obtained according to (1) under hydrothermal conditions to give a suspension containing an RUB-36 silicate, (3) separating and optionally (4) washing and/or (5) drying the RUB-36 silicate from the suspension obtained according to (2), wherein (a) either the mixture according to (1) contains at least one source of at least one element suitable for isomorphous substitution of at least a portion of the Si atoms in the silicate; and/or (b) the separated and optionally washed and/or dried RUB-36 silicate according to (3) is post-treated, thereby isomorphously substituting at least a portion of the Si atoms in the silicate with at least one suitable element.

According to a further preferred process, the isomorphously substituted silicate of structure type RUB-36 can be prepared by a two-step process comprising (1) providing a mixture containing silica or a precursor thereof, at least one structure directing agent (SDA) allowing for the crystallization of the layered silicate, and water;

(2) heating the mixture obtained according to (1) under hydrothermal conditions to give a precursor suspension;

(3) adding at least one source at least one element suitable for isomorphous substitution of at least a portion of the Si atoms in the layered silicate to the precursor suspension;

(4) heating the mixture obtained according to (3) under hydrothermal conditions to give the layered silicate.

RUB-39

The precursor layered silicate RUB-39 according to the present invention is defined as a compound having an X-ray diffraction pattern comprising at least the following reflections:

| Diffraction angle 2θ/° [Cu K(alpha 1)] | Intensity (%) |
|---|---|
| 8.15-8.35 | 100.0 |
| 16.39-16.59 | 2-12 |
| 19.87-20.07 | 7-17 |
| 23.41-23.61 | 9-19 |
| 29.94-30.14 | 1-11 |
| 35.90-36.10 | 0.5-10 | wherein 100% relates to the intensity of the maximum peak in the X-ray diffraction pattern.

As to possible processes for the preparation of RUB-39 silicates, reference is made to WO2005/100242 A1, in particular examples 1 and 2 on pages 32 and 33; WO 2007/042531 A1, in particular example 1 on page 38, example 2 on page 39, example 3 on page 40, example 6 on page 41, and example 7 on page 42; or WO 2008/122579 A2, in particular example 1 on page 36 and example 3 on page 37.

In particularly preferred embodiments, the RUB-39 precursor is a layered silicate obtained according to Example 2, or obtainable by any other conceivable procedure which yields the same or substantially the same layered silicate or any isomorphous derivative thereof. As far as isomorphously substituted RUB-39 silicates are concerned, particularly preferred silicates contain, as substituting elements, at least one element selected from the group consisting of Al, B, Fe, Ti, Sn, Ga, Ge, Zr, V, Nb, and a mixture of two or more thereof, especially preferably Al. These contain silicates not only Si atoms in the silicate structure, but also, as isomorphous substitution of at least a portion of the Si atoms in the silicate structure, at least one of the suitable elements. Such isomorphously substituted RUB-39 silicates may be prepared, for example, by a two-step process comprising (1) providing a mixture containing silica or a precursor thereof, at least one structure directing agent (SDA) allowing for the crystallization of the layered silicate, and water;

(2) heating the mixture obtained according to (1) under hydrothermal conditions to give a precursor suspension;

(3) adding at least one source at least one element suitable for isomorphous substitution of at least a portion of the Si atoms in the layered silicate to the precursor suspension;

(4) heating the mixture obtained according to (3) under hydrothermal conditions to give the layered silicate.

RUB-15

The preparation of the layered silicate RUB-15 is disclosed, for example, in Oberhagemann, U., P. Bayat, B. Marler, H. Gies, and J. Rius: *Synthesis and structure of the zeolite precursor RUB-15:* $[N(CH_3)_4]_8[Si_{24}O_{52}(OH)_4] \cdot 20H_2O$. Angewandte Chemie, Intern. Ed. Engl. 35, no. 23/24: (1996), pp. 2869-2872.

BLS-1

According to the present invention, the precursor layered silicate BLS-1 is defined as a compound having an X-ray diffraction pattern comprising at least the following reflections:

| Diffraction angle 2θ/° [Cu K(alpha 1)] | Intensity (%) |
|---|---|
| 6.09-6.29 | 80-100 |
| 7.90-8.10 | 80-100 |
| 20.30-20.50 | 9-19 |
| 23.95-24.15 | 11-21 |
| 24.81-25.01 | 16-26 |
| 25.34-25.54 | 16-26 |
| 26.56-26.76 | 8-18 | wherein 100% relates to the intensity of the maximum peak in the X-ray diffraction pattern.

In particular, the BLS-1 precursor is a layered silicate obtained according to Example 3, or obtainable by any other conceivable procedure which yields the same or substantially the same layered silicate or any isomorphous derivative thereof.

In preferred embodiments, the precursor layered silicate BLS-1 is obtained or obtainable by a process comprising
(1) providing a mixture containing silica and/or at least one silica precursor, water, at least one tetraalkylammonium compound selected from the group consisting of diethyldimethylammonium compounds, triethylmethylammonium compounds, and mixtures of diethyldimethylammonium and triethylmethylammonium compounds, and at least one base, and optionally at least one suitable seeding material; preferably a mixture containing amorphous silica, water, and diethyldimethylammonium hydroxide, and at least one suitable seeding material, preferably BLS-1 as seeding material;
(2) heating the mixture obtained according to (1) under autogenous pressure (hydrothermal conditions) to a temperature in the range of from to 120 to 160° C. for a period in the range of from 8.5 to 9.5 days to give a suspension containing the layered silicate BLS-1; preferably to a temperature in the range of from 139 to 141° C. for a period in the range of from 8.6 to 8.9 days to give a suspension containing the layered silicate BLS-1;
wherein the mixture obtained according to (1) contains $SiO_2$ and/or the silica precursor calculated as $SiO_2$, the at least one tetraalkylammonium compound and water in the molar ratios $SiO_2$:tetraalkylammonium compound:water of 1:(0.45-0.55):(9.5-10.5), preferably of 1:(0.49-0.51):(9.9-10.1).

BLS-3

According to the present invention, the precursor layered silicate BLS-3 is defined as a compound having an X-ray diffraction pattern comprising at least the following reflections:

| Diffraction angle 2θ/° [Cu K(alpha 1)] | Intensity (%) |
|---|---|
| 6.02-6.22 | 100 |
| 18.80-19.00 | 4-14 |
| 19.47-19.67 | 3-13 |
| 22.74-22.94 | 8-18 |
| 23.74-23.94 | 4-14 |
| 26.45-26.65 | 3-13 |
| 31.05-31.25 | 7-17 | wherein 100% relates to the intensity of the maximum peak in the X-ray diffraction pattern.

In particular, the BLS-3 precursor is a layered silicate obtained according to Example 4, or obtainable by any other conceivable procedure which yields the same or substantially the same layered silicate or any isomorphous derivative thereof.

In preferred embodiments, the precursor layered silicate BLS-3 is obtained or obtainable by a process comprising
(1) providing a mixture containing silica and/or at least one silica precursor, water, at least one tetraalkylammonium compound selected from the group consisting of diethyldimethylammonium compounds, triethylmethylammonium compounds, and mixtures of diethyldimethylammonium and triethylmethylammonium compounds, and at least one base, and optionally at least one suitable seeding material; preferably a mixture containing amorphous silica, water, and diethyldimethylammonium hydroxide, and at least one suitable seeding material, preferably a BLS-3 seeding material;
(2) heating the mixture obtained according to (1) under autogenous pressure (hydrothermal conditions) to a temperature in the range of from to 120 to 160° C. for a period in the range of from 7.5 to 8.5 days to give a suspension containing the layered silicate BLS-3; preferably to a temperature in the range of from to 139 to 141° C. for a period in the range of from 7.8 to 8.2 days to give a suspension containing the layered silicate BLS-3,
wherein the mixture obtained according to (1) contains $SiO_2$ and/or the silica precursor calculated as $SiO_2$, the at least one tetraalkylammonium compound and water in the molar ratios $SiO_2$:tetraalkylammonium compound:water of 1:(0.45-0.55):(12.0-13.0), preferably of 1:(0.49-0.51):(12.5-12.7)

Silylating Agents

In step (2) of the process of the present invention, said layered silicate is mixed with water and at least one silicon containing compound according to formula (I)

$$R_{4-m}Si[-(SiR_2)_n-R]_m \quad (I)$$

m is 1, 2, 3, or 4; and
n is an integer greater than or equal to 0;
wherein when n is equal to 0, at least one residue R is a leaving group, and
wherein none of the residues R contains Si.

Generally, the layered silicate which is mixed with the compound according to formula (I) can be employed "as-synthesized", i.e. as a layered silicate which is still contained in its mother liquor resulting from the crystallization of the layered silicate. Preferably, prior to step (2) of the present invention, the layered silicate is separated from its mother liquor, wherein the separation can be effected, for example, by means of filtration, ultrafiltration, diafiltration or centrifugation methods or, for example, spray drying and spray granulation methods. Further preferably, the separated layered silicate is subjected to at least one washing step and/or at least one drying step, more preferably to at least one washing step and at least one drying step prior to step (2) of the present invention. The drying temperatures are generally in the range of from room temperature to 180° C., more preferably of from 55 to 165° C., more preferably of from 65 to 150° C., and particularly preferably in the range of from 75 to 125° C.

Washing agents which may be used are, for example, water, alcohols, such as methanol, ethanol or propanol, or mixtures of two or more thereof.

In principle, any silicon containing compound according to formula (I) may be used in the process of the present invention, provided that under suitable conditions at least part of the silicon contained therein reacts with the layered silicate as provided in (1), thus forming a compound which comprises both said silicon and the layered silicate.

Preferably used silicon containing compounds according to formula (I) are compounds wherein at least one of the residues R is an alkyl group. Preferably, said at least one alkyl group is selected from the group consisting of $C_1$ to $C_5$ alkyl, more preferably $C_1$ to $C_4$ alkyl, more preferably from $C_1$ to $C_3$ alkyl, even more preferably from $C_1$ and $C_2$ alkyl. In particularly preferred embodiments, the at least one alkyl group is $C_1$ alkyl.

Among these preferred embodiments it is further preferred that the at least one alkyl group is selected from the group consisting of methyl, ethyl, n-propyl, and n-butyl, more preferably from the group consisting of methyl and ethyl. In particularly preferred embodiments, the at least one alkyl group is methyl.

Accordingly, the at least one silicon containing compound may be selected from the group consisting of dialkylsilanes, dichlorodialkylsilanes, dibromodialkylsilanes, dialkoxydialkylsilanes, trialkylsilanes, chlorotrialkylsilanes, bromotrialkylsilanes, alkoxytrialkylsilanes, tetraalkyldisilanes, pentaalkyldisilanes, hexaalkyldisilanes, tris(trialkylsilyl)silanes, tetrakis(trialkylsilyl)silane, and mixtures of two or more thereof.

In preferred embodiments, the at least one silicon containing compound according to formula (I) is selected from the group consisting of dichlorodimethylsilane, dimethoxydimethylsilane, diethoxydimethylsilane, dichlorodiethylsilane, dimethoxydiethylsilane, diethoxydiethylsilane, trimethylsilane, triethylsilane, chlorotrimethylsilane, chlorotriethylsilane, methoxytrimethylsilane, methoxytriethylsilane, ethoxytrimethylsilane, ethoxytriethylsilane, hexamethyldisilane, 1,2-diethoxy-1,1,2,2-tetramethyldisilane, tris(trimethylsilyl)silane, tetrakis(trimethylsilyl)silane, and mixtures thereof, more preferably from the group consisting of dichlorodimethylsilane, dimethoxydimethylsilane, diethoxydimethylsilane, dichlorodiethylsilane, dimethoxydiethylsilane, diethoxydiethylsilane, trimethylsilane, triethylsilane, chlorotrimethylsilane, chlorotriethylsilane, methoxytrimethylsilane, methoxytriethylsilane, ethoxytrimethylsilane, ethoxytriethylsilane, and hexamethyldisilane.

In a particularly preferred embodiment, the at least one silicon containing compound may be selected from the group consisting of dichlorodimethylsilane, diethoxydimethylsilane, triethylsilane, chlorotrimethylsilane, chlorotriethylsilane, ethoxytrimethylsilane, and hexamethyldisilane.

Therefore, the present invention also relates to a process, wherein in the at least one silicon containing compound according to formula (I), the functionalities R, independently from one another, are selected from the group consisting of $C_1$ to $C_5$ alkyl groups and leaving groups.

According to a further embodiment of the present invention, it is preferred that the at least one silicon containing compound is selected from the group consisting of trialkylsilanes, chlorotrialkylsilanes, bromotrialkylsilanes, alkoxytrialkylsilanes, tetraalkyldisilanes, pentaalkyldisilanes, hexaalkyldisilanes, tris(trialkylsilyl)silanes, tetrakis(trialkylsilyl)silane, and mixtures thereof.

According to said embodiment, the at least one silicon containing compound is preferably selected from the group consisting of trimethylsilane, triethylsilane, chlorotrimethylsilane, chlorotriethylsilane, methoxytrimethylsilane, methoxytriethylsilane, ethoxytrimethylsilane, ethoxytriethylsilane, hexamethyldisilane, 1,2-diethoxy-1,1,2,2-tetramethyldisilane, tris(trimethylsilyl)silane, tetrakis(trimethylsilyl)silane, and mixtures thereof, more preferably from the group consisting of trimethylsilane, triethylsilane, chlorotrimethylsilane, chlorotriethylsilane, methoxytrimethylsilane, methoxytriethylsilane, ethoxytrimethylsilane, ethoxytriethylsilane, and hexamethyldisilane, and mixtures thereof.

In said embodiment it is particularly preferred that the at least one silicon containing compound is selected from the group consisting of triethylsilane, chlorotrimethylsilane, chlorotriethylsilane, ethoxytrimethylsilane, and hexamethyldisilane, and mixtures thereof.

Therefore, the present invention also relates to a process, wherein in the at least one silicon containing compound according to formula (I), when n is equal to 0, only one residue R is a leaving group.

In particular embodiments of the present invention, the at least one silicon containing compound does not comprise dichlorodimethylsilane, diethoxydimethylsilane, triethoxymethylsilane, tetraethoxysilane, or two or more thereof.

According to the present invention, R is optionally a leaving group, provided that the at least one silicon containing compound according to formula (I) comprises more than one silicon atom. The leaving group is suitably chosen among any chemical functionality, provided that according to the process of the present invention it may suitably become dissociated from the silicon containing compound.

According to a further embodiment of the present invention, the at least one silicon containing compound according to formula (I) is selected from the group consisting of tetraalkyldisilanes, pentaalkyldisilanes, hexaalkyldisilanes, tris(trialkylsilyl)silanes, tetrakis(trialkylsilyl)silane, and mixtures thereof.

According to said embodiment the at least one silicon containing compound is preferably selected from the group consisting of hexamethyldisilane, 1,2-diethoxy-1,1,2,2-tetramethyldisilane, tris(trimethylsilyl)silane, tetrakis(trimethylsilyl)silane, and mixtures thereof, wherein hexamethyldisilane is particularly preferred.

Therefore, the present invention also relates to a process, wherein in the at least one silicon containing compound according to formula (I), n is greater than or equal to 1.

According to a further embodiment of the present invention, the at least one silicon containing compound according to formula (I) is selected from the group consisting of tetraalkyldisilanes, pentaalkyldisilanes, hexaalkyldisilanes, and mixtures thereof.

According to said embodiment the at least one silicon containing compound is preferably hexamethyldisilane and/or 1,2-diethoxy-1,1,2,2-tetramethyldisilane, wherein hexamethyldisilane is particularly preferred.

Index n=0

According to the present invention, in the compound according to formula (I), at least one residue R is a leaving group when n is equal to 0.

Within the meaning of the present invention, the term "leaving group" refers to a chemical functionality which becomes dissociated from the silicon containing compound according to formula (I) during step (2) and/or step (3) of the process of the present invention. In particular, within the meaning of the present invention, a leaving group is not a functionality comprising a carbon atom which forms a covalent bond to the at least one silicon atom of formula (I). In particular, a leaving group is not alkyl.

According to the present invention, at least one of the chemical functionalities R is a leaving group when the silicon containing compound according to formula (I) only contains one silicon atom. In these embodiments, it is preferred in the present invention that the at least one silicon containing compound according to formula (I) contains one to three leaving groups. In particularly preferred embodiments thereof, the at least one silicon containing compound contains one or two leaving groups, most preferably one leaving group.

In the present invention it is preferred that the at least one leaving group is selected among the group consisting of hydrogen, halogen and $C_1$ to $O_3$ alkoxy, preferably from the group consisting of hydrogen, chlorine, bromine, and $C_1$ and $C_2$ alkoxy, more preferably from the group consisting of hydrogen, ethoxy, methoxy, and chlorine. In a particularly preferred embodiment, the at least one leaving group is ethoxy and/or chlorine.

As far as the case of n=0 is concerned, the most preferred silicates provided in (1) are selected from the group consisting of RUB-15, RUB-36, RUB-39, BLS-1, and BLS-3.

Therefore, the present invention relates to a process for the preparation of a silicate compound, comprising
(1) providing at least one layered silicate selected from the group consisting of RUB-15, RUB-36, RUB-39, BLS-1, and BLS-3, preferably from the group consisting of RUB-36, RUB-39, BLS-1, and BLS-3;
(2) mixing said layered silicate with water and at least one silicon containing compound according to formula (I)

$$R_{4-m}Si[—(SiR_2)_n—R]_m \qquad (I)$$

wherein
m is 1, 2, 3, or 4; and n=0;
wherein at least one residue R is a leaving group, and
wherein none of the residues R contains Si.

Further, for n=0, the at least one silicon containing compound is preferably selected from the group consisting of dialkylsilanes, dichlorodialkylsilanes, dibromodialkylsilanes, dialkoxodialkylsilanes, trialkylsilanes, chlorotrialkylsilanes, bromotrialkylsilanes, alkoxytrialkylsilane, and mixtures of two or more thereof.

More preferably, for n=0, the at least one silicon containing compound is selected from the group consisting of dichlorodimethylsilane, dimethoxydimethylsilane, diethoxydimethylsilane, dichlorodiethylsilane, dimethoxydiethylsilane, diethoxydiethylsilane, trimethylsilane, triethylsilane, chlorotrimethylsilane, chlorotriethylsilane, methoxytrimethylsilane, methoxytriethylsilane, ethoxytrimethylsilane, ethoxytriethylsilane, and mixtures of two or more thereof, even more preferably from the group consisting of dichlorodimethylsilane, dimethoxydimethylsilane, diethoxydimethylsilane, dichlorodiethylsilane, dimethoxydiethylsilane, diethoxydiethylsilane, trimethylsilane, triethylsilane, chlorotrimethylsilane, chlorotriethylsilane, methoxytrimethylsilane, methoxytriethylsilane, ethoxytrimethylsilane, ethoxytriethylsilane, and mixtures of two or more thereof.

In a particularly preferred embodiment, when n=0, the least one silicon containing compound is selected from the group consisting of dichlorodimethylsilane, diethoxydimethylsilane, triethylsilane, chlorotrimethylsilane, chlorotriethylsilane, ethoxytrimethylsilane, and mixtures of two or more thereof.

Therefore, the present invention also relates to the process as described above, wherein the least one silicon containing compound is selected from the group consisting of dichlorodimethylsilane, diethoxydimethylsilane, triethylsilane, chlorotrimethylsilane, chlorotriethylsilane, ethoxytrimethylsilane, and mixtures of two or more thereof and the layered silicate provided in (1) is selected from the group consisting of RUB-15, RUB-36, RUB-39, BLS-1, and BLS-3.

According to a still further preferred embodiment of the present invention, when n=0, only one group R is a leaving group. Therefore, the present invention also relates to a process, wherein in the at least one silicon containing compound according to formula (I), when n is equal to 0, only one residue R is a leaving group. This embodiment is especially preferred for all conceivable layered silicates to be provided in (1), and even more preferred for a layered silicate selected from the group consisting of RUB-15, RUB-36, RUB-39, BLS-1, and BLS-3.

Therefore, the present invention relates to a process for the preparation of a silicate compound, comprising
(1) providing at least one layered silicate, preferably selected from the group consisting of RUB-15, RUB-36, RUB-39, BLS-1, and BLS-3, preferably more from the group consisting of RUB-36, RUB-39, BLS-1, and BLS-3;
(2) mixing said layered silicate with water and at least one silicon containing compound according to formula (I)

$$R_{4-m}Si[—(SiR_2)_n—R]_m \qquad (I)$$

wherein
m is 1, 2, 3, or 4; and n=0;
wherein exactly one of the residues R is a leaving group, and
wherein none of the residues R contains Si.

In this embodiment according to which the silicon containing compound according to formula (I) contains only one leaving group, it is particularly preferred that the least one silicon containing compound is selected from the group consisting of triethylsilane, chlorotrimethylsilane, chlorotriethylsilane, ethoxytrimethylsilane, and mixtures of two or more thereof.

In particular embodiments of the present invention, the at least one silicon containing compound does not comprise dichlorodimethylsilane, diethoxydimethylsilane, triethoxymethylsilane, or tetraethoxysilane.

Index n is Greater than or Equal to 1

According to the present invention, it was surprisingly found that also silicon containing compounds according to formula (I) can be used for the preparation of pillared silicates, starting from layered silicates in general.

Therefore, according to a preferred embodiment, the present invention relates to a a process for the preparation of a silicate compound, comprising
(1) providing at least one layered silicate;
(2) mixing said layered silicate with water and at least one silicon containing compound according to formula (I)

$$R_{4-m}Si[—(SiR_2)_n—R]_m \qquad (I)$$

wherein
m is 1, 2, 3, or 4; and
n is an integer greater than or equal to 1; and
wherein none of the residues R contains Si.

Also, the present invention relates to this process, wherein the layered silicate provided in (1) is selected from the group consisting of RUB-15, RUB-36, RUB-39, BLS-1, and BLS-3, preferably from the group consisting of RUB-36, RUB-39, BLS-1, and BLS-3.

Generally, n can be chosen according to the respective needs. Preferably, n is in the range of from 1 to 5, more preferably from 1 to 4, more preferably from 1 to 3, more preferably from 1 to 2, and especially preferably 1.

When n is greater than or equal to 1, index m according to formula (I) is generally in the range of from 1 to 4, preferably from 1 to 3, more preferably from 1 to 2, and especially preferably 1.

Therefore, the present invention also relates the process as described above, wherein n is greater than or equal to 1, preferably 1, and m is 1.

As to the case wherein n is greater than or equal to 1, the at least one silicon containing compound is preferably selected from the group consisting of tetraalkyldisilanes, pentaalkyldisilanes, hexaalkyldisilanes, tris(trialkylsilyl)silanes, tetrakis(trialkylsilyl)silane, and mixtures of two or more thereof, more preferably from the group consisting of hexamethyldisilane, 1,2-diethoxy-1,1,2,2-tetramethyldisilane, tris(trimethylsilyl)silane, tetrakis(trimethylsilyl)silane, and mixtures of two or more thereof. Even more preferably, the silicon containing compound is hexamethyldisilane.

The present invention also relates to the mixture obtainable or obtained from step (2) of the process of the present invention.

Mixture Obtained in (2)

The weight ratios of the layered silicate contained in the mixture according to (2), the at least one silicon containing compound according to formula (I) and water can be adjusted substantially as desired, provided that it is ensured that, according to (2) and/or (3), at least one pillared silicate is obtained.

Preferably, in the mixture obtained in (2), the weight ratios of the layered silicate:water is in the ranges of 1:(20-80), more preferably 1:(30-75), more preferably 1:(40-70), more preferably 1:(50-65), even most preferably 1:(55-65).

Also preferably, in the mixture obtained in (2), the molar ratios of the at least one silicon containing compound according to formula (I) and water is in the ranges of 1:(500-3000), more preferably 1:(800-2800), even more preferably 1:(1500-2500), even more preferably 1:(1800-2200).

It may be necessary to adjust the water content of the mixture to a desired value. As a suitable method preferred inter alia, the water content is adjusted by removing water in at least one suitable apparatus. The water is removed preferably at a temperature in the range of from 60 to 85° C., more preferably of from 65 to 80° C., and particularly preferably of from 65 to 75° C. Rotary evaporators or ovens may be mentioned, inter alia, as at least one suitable apparatus. Inter alia, apparatuses which permit removal of water at reduced pressure and hence at low temperatures may be preferred in this context.

Prior to subjecting the mixture according to (2) to hydrothermal conditions as described hereinunder, it is especially preferred to add at least one suitable acid to the mixture. Inorganic acids are preferred, with hydrochloric acid being especially preferred. According to a particularly preferred embodiment of the present invention, the at least one suitable acid is not $HNO_3$.

The pH, as determined by taking the respective value as shown by a conventional glass electrode, of the resulting mixture subjected to hydrothermal treatment in (3) is preferably below 7, more preferably 6 or less, more preferably in the range of from 0.1 to 5, more preferably from 0.2 to 3, and even more preferably from 0.5 to 2.

Hydrothermal Crystallization

According to a particularly preferred embodiment, the present invention also relates to the process as described above which, in addition to steps (1) and (2), additionally comprises, after step (2), (3) subjecting the mixture obtained in (2) to hydrothermal conditions.

By subjecting the mixture obtained in (2) to hydrothermal conditions, a suspension is obtained containing a pillared silicate. Therefore, the present invention also relates to the process as described above which, in addition to steps (1) and (2), additionally comprises, after step (2), (3) subjecting the mixture obtained in (2) to hydrothermal conditions to obtain a suspension containing the pillared silicate.

Accordingly, the present invention also relates to a process for the preparation of a pillared silicate, comprising (1) providing at least one layered silicate;
(2) mixing said layered silicate with water and at least one silicon containing compound according to formula (I)

$$R_{4-m}Si[-(SiR_2)_n-R]_m \qquad (I)$$

wherein m is 1, 2, 3, or 4; and n is an integer greater than or equal to 0;

wherein when n is equal to 0, at least one residue R is a leaving group, and wherein none of the residues R contains Si;

(3) subjecting the mixture obtained in (2) to hydrothermal conditions to obtain a suspension containing the pillared silicate.

In preferred embodiments of the present invention, the reaction mixture according to (2) is subjected to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa. In particular, in the process of the present invention, the silicate is preferably obtained under autogenous pressure.

In principle, it is possible to heat the reaction mixture obtained according to (2) at any suitable temperature. Preferred temperatures here are those which are above the boiling point of the solution obtained according to (2). In particular, temperatures up to 200° C. are more preferred. In particular, the hydrothermal treatment in step (3) is carried out at a temperature in the range of from 120 to 200° C., preferably of from 130 to 195° C., more preferably of from 140 to 190° C.

The period of time for which the preferred hydrothermal treatment temperature is maintained is generally the range of from 1 hour to several days. Preferably, the temperature of the hydrothermal treatment in step (3) is maintained for a period of from 1 h to 48 h, preferably of from 2 h to 36 h, more preferably from 5 h to 24 h.

For adjusting the temperature of the crystallization to one or more desired temperatures, it is further preferred to use an autoclave in step (3) which is equipped with heating and/or cooling means such as, e.g., internal and/or external heating and/or cooling means such as, e.g., a heating and/or cooling jacket. It is also possible to transfer the autoclave into an environment such as an oven, e.g. a circulating air oven, or the like which allows for maintaining a desired temperature in the synthesis mixture.

The synthesis mixture is preferably suitably stirred for the crystallization according to (4). It is also possible to rotate the reaction vessel in which the crystallization is carried out.

Also two or more different temperatures may be used during hydrothermal treatment in (3). In this context, it is possible to adjust the temperature to a certain value in the above-mentioned ranges, maintaining this temperature for a certain period of time, and then to increase or decrease the temperature to another value within above-mentioned ranges. Contrary or in addition to this stepwise adjustment of the temperature, the crystallization temperature may be gradually decreased or increased during hydrothermal crystallization.

In general, the applied heating rates, either as far as heating the mixture according to (2) the temperature in (3) and/or as far as heating the mixture during (3) is/are concerned, can be suitably chosen. Preferably, the heating rates are in the range of from 0.1° C./min to 20° C./min, preferably from 0.3° C./min to 15° C./min and in particular from 0.5° C./min to 10° C./min.

According to an embodiment of the process of the present invention, the heating according to (2) and/or hydrothermal treatment according to (3) can be stopped by suitable quenching. Here, it is particularly preferred to add water to the reaction mixture, said water being at a temperature which is suitable for stopping the crystallization.

The present invention also relates to the suspension obtainable or obtained after step (3) by the process as described above.

Separation

Thus, the present invention also relates to the pillared silicate obtainable or obtained by the process consisting of steps (1) to (3).

According to the process of the present invention, the pillared silicate contained in the suspension obtained after hydrothermal treatment in (3), is preferably separated off in a suitable manner in at least one step from the suspension. This separation can be effected, for example, by means of filtration, ultrafiltration, diafiltration or centrifuging methods or, for example, spray drying and spray granulation methods. Separation by means of spray drying or filtration is preferred.

Therefore, the present invention also relates to the process as described above, additionally comprising
(4) separating the pillared silicate from the suspension obtained according to (3);

The separation can be followed by at least one washing step and/or at least one drying step, wherein it is possible to use identical or different washing agents or washing agent mixtures in at least two washing steps and to use identical or different drying temperatures in at least two drying steps.

Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, water being very particularly preferred as the only washing agent.

According to an especially preferred embodiment of the present invention, the separated pillared silicate is washed, in a first step, at least once with the filtrate obtained from the separation, and subsequently washed, in a second step, at least once with s suitable washing agent as described above.

Preferably, the separated pillared material is washed until the pH of the washing agent, preferably the washwater, is in the range of from 6 to 8, preferably from 6.5 to 7.5, as determined via a standard glass electrode.

Therefore, the present invention also relates to the process as described above, additionally comprising
(5) washing the pillared silicate obtained from (4) via filtration, said washing preferably comprising
  (a) washing the separated pillared silicate at least once, preferably once, with the filtrate obtained from (4);
  (b) washing the pillared material obtained from (a) at least once with at least one suitable washing agent other than said filtrate, preferably with water.

According to a still further preferred embodiment of the present invention, the separated and/or washed pillared material is dried in at least one suitable step. Typical drying temperatures are in the range of from The drying temperatures here are preferably in the range of from room temperature to 150° C., more preferably of from 80 to 150° C., more preferably of from 90 to 145° C., and particularly preferably in the range of from 100 to 140° C.

The period of time for which the preferred drying temperature is maintained is generally the range of from 1 hour to several days. Preferably, the temperature of the hydrothermal treatment in step (3) is maintained for a period of from 1 h to 48 h, preferably of from 2 h to 36 h, more preferably from 5 h to 24 h.

Therefore, the present invention also relates to the process as described above, additionally comprising
(6) drying the optionally separated and/or optionally washed pillared silicate, said drying preferably being effected at a temperature in the range of from 80 to 150° C., preferably of from 100 to 140° C.

Further, the present invention also relates to the pillared silicate obtainable or obtained by the process consisting of steps (1), (2), (3), (4) and/or (5) and/or (6).

Also, the present invention relates to a process as described above, comprising
(4) separating the pillared silicate from the suspension obtained according to (3);
(5) washing the pillared silicate obtained from (4) via filtration, said washing preferably comprising
  (a) washing the separated pillared silicate at least once, preferably once, with the filtrate obtained from (4);
  (b) washing the pillared material obtained from (a) at least once with at least one suitable washing agent other than said filtrate, preferably with water;
(6) drying the optionally separated and/or optionally washed pillared silicate, said drying preferably being effected at a temperature in the range of from 80 to 150° C., preferably of from 100 to 140° C.

Calcination

According to a further embodiment of the process of the present invention, the pillared silicate obtained according to (2) and/or (3) is calcined according to (7) in at least one additional step. It is in principle possible to subject the suspension comprising the pillared silicate obtained from (2) and/or (3) directly to calcination. Preferably, the pillared silicate is separated off from the suspension, as described above according to (4), prior to the calcination. Prior to the calcination, the silicate separated off from the suspension can be subjected to at least one washing step (5) as described above and/or at least one drying step (6) as described above.

The calcination according to (7) of the silicate obtained according to (2) or (3) or (4) or (5) or (6) is preferably effected at a temperature in the range of up to 700° C. to give the pillared tectosilicate. More preferably, the calcination temperatures are in the range of from 450 to 700° C., even more preferably of from 500 to 650° C.

Thereby, according to a preferred embodiment of the process of the present invention, the heating of the pillared silicate is carried out from room temperature or drying temperature to a temperature of up to 700° C., the heating rate further preferably being in the range of from 0.1 to 20° C./min, more preferably of from 0.2 to 10° C./min, and particularly preferably in the range of from 0.5 to 5° C./min.

According to a possible embodiment of the process of the present invention, the calcination is carried out stepwise at successive temperatures. The term "stepwise at successive temperatures" as used in the context of the present invention refers to a calcination in which the silicate to be calcined is heated to a certain temperature, is kept at this temperature for a certain time, and is heated from this temperature to at least one further temperature and is once again kept there for a certain time. If stepwise calcination is carried out, the silicate to be calcined is preferably kept at up to 4, more preferably at up to 3, particularly preferably at 2 temperatures.

The calcination can be effected in any suitable atmosphere, for example air, lean air, nitrogen, steam, synthetic air or carbon dioxide. The calcination is preferably effected under air.

The calcination can be carried out in any apparatus suitable for this purpose. The calcination is preferably effected in a rotating tube, in a belt calciner, in a muffle furnace, or in situ in an apparatus in which the silicate is subsequently used for the intended purpose, for example as a molecular sieve or for another application described below. A rotating tube and a belt calciner are particularly preferred here.

Accordingly, the present invention also relates to a process as described above, additionally comprising (7) calcining the optionally separated and/or optionally washed and/or dried product obtained in step (2) or (3) or (4) or (5) or (6), said calcining preferably being effected at a temperature in the range of from 450 to 700° C., preferably of from 500 to 650° C.

The present invention accordingly also relates to a pillared tectosilicate, obtainable or obtained by the process as described above, comprising the calcination according to (7).

Accordingly, the present invention also relates to a process for the preparation of a pillared tectosilicate, comprising
(1) providing at least one layered silicate;
(2) mixing said layered silicate with water and at least one silicon containing compound according to formula (I)

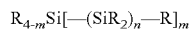　　　　(I)

wherein
m is 1, 2, 3, or 4; and
n is an integer greater than or equal to 0;
wherein when n is equal to 0, at least one residue R is a leaving group, and
wherein none of the residues R contains Si;
(3) subjecting the mixture obtained in (2) to hydrothermal conditions to obtain a suspension containing a pillared silicate;
(4) separating the pillared silicate from the suspension obtained according to (3);
(5) washing the pillared silicate obtained from (4) via filtration, said washing preferably comprising
  (a) washing the separated pillared silicate at least once, preferably once, with the filtrate obtained from (4);
  (b) washing the pillared material obtained from (a) at least once with at least one suitable washing agent other than said filtrate, preferably with water;
(6) drying the optionally separated and/or optionally washed pillared silicate, said drying preferably being effected at a temperature in the range of from 80 to 150° C., preferably of from 100 to 140° C.;

(7) calcining the optionally separated and/or optionally washed and/or dried product obtained in step (6), said calcining preferably being effected at a temperature in the range of from 450 to 700° C., preferably of from 500 to 650° C., to obtain the pillared tectosilicate.

In particular, the present invention relates to a pillared tectosilicate obtained from optionally isomorphously substituted layered silicate having RUB-36 structure, RUB-39 structure, RUB-15 structure, BLS-1 structure, or BLS-3 structure.

Further, the present invention relates to a pillared tectosilicate per se, or to a pillared tectosilicate obtainable or obtained by the process as described above, wherein the X-ray powder diffraction pattern of said tectosilicate has its maximum peak (100% intensity) at a 2 theta diffraction angle of from 7.20 to 8.00° when using the Cu K(alpha 1) wavelength in the diffraction experiment, preferably from 7.50 to 7.70, more preferably from 7.55 to 7.65, more preferably from 7.58 to 7.62.

According to an especially preferred embodiment, the present invention relates to an optionally isomorphously substituted tectosilicate obtained from an optionally isomorphously substituted layered silicate having RUB-36 structure, said tectosilicate having an X-ray diffraction pattern comprising at least the following further reflections:

| Diffraction angle 2 theta/° [Cu K(alpha 1)] | Intensity (%) |
|---|---|
| 7.52-7.68 | 100 |
| 19.76-19.92 | 0.5-10 |
| 22.83-22.99 | 6-16 |
| 23.72-23.88 | 3-13 |
| 25.39-25.55 | 0.5-10 |
| 25.86-26.02 | 0.5-10 |
| 26.14-26.30 | 0.5-10 | wherein 100% relates to the intensity of the maximum peak in the X-ray diffraction pattern.

Preferably, this silicate has a BET surface area determined according to DIN 66135 in the range of from 200 to 600 m²/g, preferably from 300 to 500 m²/g, more preferably from 340 to 440 m²/g.

According to an especially preferred embodiment, the present invention relates to an optionally isomorphously substituted tectosilicate obtained from an optionally isomorphously substituted layered silicate having RUB-39 structure, said tectosilicate having an X-ray diffraction pattern comprising at least the following further reflections:

| Diffraction angle 2 theta/° [Cu K(alpha 1)] | Intensity (%) |
|---|---|
| 7.82-7.98 | 100 |
| 15.56-15.72 | 1.5-11.5 |
| 15.76-15.92 | 1.5-11.5 |
| 19.42-19.58 | 0.5-10 |
| 23.43-23.59 | 2-12 |
| 23.84-24.00 | 1-11 | wherein 100% relates to the intensity of the maximum peak in the X-ray diffraction pattern.

Preferably, this silicate has a BET surface area determined according to DIN 66135 in the range of from 150 to 600 m²/g, preferably from 200 to 400 m²/g, more preferably from 260 to 360 m²/g.

According to an especially preferred embodiment, the present invention relates to an optionally isomorphously substituted tectosilicate obtained from an optionally isomorphously substituted layered silicate having BLS-1 structure, said tectosilicate having an X-ray diffraction pattern comprising at least the following further reflections:

| Diffraction angle 2 theta/° [Cu K(alpha 1)] | Intensity (%) |
|---|---|
| 7.51-7.71 | 100 |
| 22.84-23.04 | 10-21 |
| 23.74-23.94 | 8-18 |
| 25.36-25.56 | 6-16 |
| 25.87-26.07 | 4-14 |
| 26.13-26.33 | 5-15 | wherein 100% relates to the intensity of the maximum peak in the X-ray diffraction pattern.

Preferably, this silicate has a BET surface area determined according to DIN 66135 in the range of from 150 to 600 m$^2$/g, preferable 250 to 400 m$^2$/g, more preferably 270 to 360 m$^2$/g.

As described above, the layered silicate provided in (1) can be isomorphously substituted with at least one suitable element. As far as isomorphous substitution is concerned, this is preferred. However, according to the present invention, it is also conceivable to prepare a pillared silicate based on an all-silica layered silicate and conduct isomorphous substitution during hydrothermal treatment in (3). Further, it is conceivable to prepare the pillared silicate and suitably post-treat the pillared silicate, e.g. after (3) or (4) or (5) or (6), thereby isomorphously substituting at least a portion of the Si atoms of the pillared silicate structure. Also, it is conceivable to suitably post-treat the tectosilicate obtained from (7), thereby isomorphously substituting at least a portion of the Si atoms of the tectosilicate structure. Also in these cases, preferred suitable elements according to the present invention are selected from the group consisting of Al, B, Fe, Ti, Sn, Ga, Ge, Zr, V, Nb, and a mixture of two or more thereof.

Moldings

In many technical applications, the user often desires to employ the silicates which have been processed to moldings, instead of the silicate as such. Such moldings are necessary in particular in many industrial processes, in order, for example, to be able to expediently operate separations of substances from mixtures in, for example, tube reactors.

The present invention accordingly also relates to a molding comprising at least one pillared silicate and/or to the calcined tectosilicate product thereof as described above, or at least one pillared silicate and/or to the calcined tectosilicate product thereof obtainable by a process as described above. In particular, the term silicate used in the following refers to the pillared silicates and/or to the calcined tectosilicate products thereof according to the present invention as well as to the pillared silicates and/or to the calcined tectosilicate products thereof obtainable by a process as described above, as well as mixtures of two or more of these silicates.

In general, the molding may comprise all conceivable further compounds in addition to the at least one pillared silicate and/or to the calcined tectosilicate product thereof of the present invention, provided that it is ensured that the resulting molding is suitable for the desired application.

In the context of the present invention, it is preferred if at least one suitable binder material is used in the production of the molding. In the context of this preferred embodiment, more preferably a mixture of at least one pillared silicate and/or to the calcined tectosilicate product thereof and the at least one binder is prepared. Suitable binders are in general all compounds which impart adhesion and/or cohesion between the particles of the RUB-36 and/or RUB-37 which are to be bound, over and above the physisorption which may be present without a binder. Examples of such binders are metal oxides, such as SiO$_2$, Al$_2$O$_3$, TiO$_2$, ZrO$_2$ or MgO, or clays or mixtures of two or more of these compounds. As Al$_2$O$_3$ binders, clay minerals and naturally occurring or synthetic aluminas, for example alpha-, beta-, gamma-, delta-, eta-, kappa-, chi- or theta-alumina and the inorganic or organometallic precursor compounds thereof, such as gibbsite, bayerite, boehmite, pseudoboehmite or trialkoxyaluminates, such as aluminum triisopropylate are preferred in particular. Further preferred binders are amphiphilic compounds having a polar and a nonpolar moiety, and graphite. Further binders are, for example, clays, such as montmorillonites, kaolins, bentonites, halloysites, dickites, nacrites or anaxites. These binders can be used as such. In the context of the present invention, it is also possible to use compounds from which the binder is formed in at least one further step in the production of the moldings. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate. In the context of the present invention, binders which either completely or partly consist of SiO$_2$ or are a precursor of SiO$_2$, from which SiO$_2$ is formed in at least one further step in the production of the moldings are to be mentioned. In this context, both colloidal silica and "wet process" silica as well as "dry process" silica can be used. These are very particularly preferably amorphous silica, the size of the silica particles being, for example, in the range of from 5 to 100 nm and the surface of the silica particles being in the range of from 50 to 500 m$^2$/g. Colloidal silica, preferably in the form of an alkaline and/or ammoniacal solution, more preferably in the form of an ammoniacal solution, is, for example, commercially available as, inter alia, Ludox®, Syton®, Nalco® or Snowtex®. "Wet process" silica is, for example, commercially available, inter alia, as Hi-Sil®, Ultrasil®, Vulcasil®, Santocel®, Valron-Estersil®, Tokusil® or Nipsil®. "Dry process" silica is, for example, commercially available, inter alia, as Aerosil®, Reolosil®, Cab-O-Sil®, Fransil® or ArcSilica®. The binders are preferably used in an amount which leads to the finally resulting moldings whose binder content is up to 80% by weight, more preferably in the range of from 5 to 80% by weight, more preferably in the range of from 10 to 70% by weight, more preferably in the range of from 10 to 60% by weight, more preferably in the range of from 15 to 50% by weight, more preferably in the range of from 15 to 45% by weight, particularly preferably in the range of from 15 to 40% by weight, based in each case on the total weight of the finally resulting molding. The term "finally resulting molding" as used in the context of the present invention relates to a molding as obtained from the drying and calcining steps (IV) and/or (V), as described below, particularly preferably obtained from (V).

The mixture of binder or precursor of a binder and the at least one pillared silicate and/or to the calcined tectosilicate product thereof can be mixed with at least one further compound for further processing and for the formation of a plastic material. Here, inter alia, pore formers may preferably be mentioned. In the process of the present invention, all compounds which, with regard to the finished molding, provide a certain pore size and/or a certain pore size distribution and/or certain pore volumes can be used as pore formers. Preferably used pore formers in the process of the present invention are polymers which are dispersible, suspendable or emulsifiable in water or in aqueous solvent mixtures. Preferred polymers here are polymeric vinyl compounds, for example polyalkylene oxides, such as polyethylene oxides, polystyrene, polyacrylates, polymethacrylates, polyolefins, polyamides and polyesters, carbohydrates, such as cellulose or cellulose derivatives, for example methylcellulose, or sugars or natural fibers. Further suitable pore formers are, for example, pulp or graphite. If pore formers are used in the preparation of the mixture according to (I), the pore former content, preferably the polymer content of the mixture according to (I) is preferably in the range of from 5 to 90% by weight, preferably in the range of from 15 to 75% by weight, and particularly preferably in the range of from 25 to 55% by weight, based in each case on the amount of at least one pillared silicate and/or to the calcined tectosilicate product thereof in the mixture according to (I). If desired for the pore size distribution to be achieved, a mixture of two or more pore formers may also be used. In a particularly preferred embodiment of the process of the present invention, as described below, the pore formers are removed in a step (V) by calcination to give the porous molding.

In the context of a likewise preferred embodiment of the present invention, at least one pasting agent is added in the preparation of the mixture according to (I). Pasting agents which may be used are all compounds suitable for this purpose. These are preferably organic, in particular hydrophilic polymers, for example cellulose, cellulose derivatives, such as methylcellulose, starch, such as potato starch, wallpaper paste, polyacrylates, polymethacrylates, polyvinyl alcohol, polyvinylpyrrolidone, polyisobutene or polytetrahydrofuran. Accordingly, particular compounds which also act as pore formers can be used as pasting agents. In a particularly preferred embodiment of the process of the present invention as described below, these pasting agents are removed in a step (V) by calcination to give the porous molding.

According to a further embodiment of the present invention, at least one acidic additive may added during the preparation of the mixture according to (I). Organic acidic compounds which can be removed in the preferred step (V), as described below, by calcination are very particularly preferred. Carboxylic acids, for example formic acid, oxalic acid and/or citric acid, are particularly preferred. It is also possible to use two or more of these acidic compounds.

The order of addition of the components of the mixture according to (I) which contains the at least one pillared silicate and/or to the calcined tectosilicate product thereof is not critical. It is both possible first to add the at least one binder, then the at least one pore former and the at least one acidic compound and finally the at least one pasting agent and to interchange the sequence with regard to the at least one binder, the at least one pore former, the at least one acidic compound and the at least one pasting agent.

After the addition of the binder to the at least one pillared silicate and/or to the calcined tectosilicate product thereof, to which, if appropriate, at least one of the compounds described above have already been added, the mixture according to (I) is, as a rule, homogenized for from 10 to 180 minutes. Inter alia, kneaders, edge mills or extruders are particularly preferably used for the homogenization. The mixture is preferably kneaded. On the industrial scale, treatment in an edge mill is preferably employed for the homogenization. The homogenization is carried out as a rule at temperatures in the range of from about 10° C. to the boiling point of the pasting agent and normal pressure or slightly superatmospheric pressure. Thereafter, if appropriate, at least one of the compounds described above can be added. The mixture thus obtained is homogenized, preferably kneaded, until an extrudable plastic material has formed.

According to a more preferred embodiment of the invention, the homogenized mixture is molded. In the context of the present invention, those processes in which the molding is effected by extrusion in conventional extruders, for example to give extrudates having a diameter of preferably from 1 to 10 mm, particularly preferably from 2 to 5 mm, are preferred for the shaping processes. Such extrusion apparatuses are described, for example, in Ullmann's Enzyklopädie der Technischen Chemie, 4th Edition, Vol. 2, page 295 et seq., 1972. In addition to the use of a screw-type extruder, a plunger-type extruder is also preferably used for the molding. In principle, however, all known and/or suitable kneading and molding apparatuses and processes may be used for the shaping. Examples of these are inter alia: briquetting, i.e. mechanical compression with or without addition of additional binder material; pelleting, i.e. compacting by circular and/or rotational movements; sintering, i.e. the material to be molded is subjected to a thermal treatment. The shape of the moldings produced according to the invention can be chosen as desired. In particular, inter alia spheres, oval shapes, cylinders or tablets are possible.

In the context of the present invention, step (III) is preferably followed by at least one drying step.

In the context of the present invention, the step (IV) is preferably followed by at least one calcination step. The calcination is carried out at temperatures in the range of, in general, from 300 to 700° C., preferably from 400 to 600° C. The calcination can be effected under any suitable gas atmosphere, air and/or lean air being preferred. Furthermore, the calcination is preferably carried out in a muffle furnace, a rotary kiln and/or a belt calcination oven. It is possible for the temperatures during a calcination step to remain constant or to be changed continuously or discontinuously. If calcination is effected twice or more often, the calcination temperatures can be different or identical in the individual steps.

Accordingly, the present invention also relates to a process for the production of a molding as described above, comprising the steps (I) preparing of a mixture containing the at least one pillared silicate and/or to the calcined tectosilicate product thereof as described above, and optionally at least one binder;
(II) kneading of the mixture;
(III) molding of the kneaded mixture to give at least one molding;
(IV) drying of the at least one molding;
(V) calcining of the at least one dried molding.

Before and/or after the drying and/or before and/or after the calcination, the at least one molding can, if appropriate, be treated with a concentrated or dilute Broenstedt acid or a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, such as nitrilotriacetic acid, sulfosalicylic acid or ethylenediaminetetraacetic acid. If appropriate, this at least one treatment with at least one Broenstedt acid is followed by at least one drying step and/or at least one calcination step, which in each case is carried out under the conditions described above.

According to a further embodiment of the process of the present invention, the moldings obtained according to the invention can, for better hardening, be subjected to a water steam treatment, after which preferably drying is effected at least once again and/or calcination is effected at least once again. For example, after at least one drying step and at least one subsequent calcination step, the calcined molding is subjected to the steam treatment and is then dried at least once again and/or calcined at least once again.

APPLICATIONS

The present invention moreover relates to the use of the silicates of the invention, in particular of the novel silicates, and/or of the moldings of the invention, as a molecular sieve, catalyst, catalyst support or binder thereof, as adsorbents, pigments, additives in detergents, an additive for building materials, for imparting thixotropic properties to coating pastes and finishes, and applications as external and internal lubricant, as flameproofing agent, auxiliary agent and filler in paper products, in bactericidal and/or fungicidal and/or herbicidal compositions, for ion exchange, for the production of ceramics, in polymers, in electrical, optical or electrooptical components and switching elements or sensors.

Especially preferably, the silicates according to the invention are used as a molecular sieve, catalyst, catalyst component, catalyst support or binder thereof, as adsorbents, for ion exchange, for the production of ceramics, and in polymers.

The present invention is explained in more detail with reference to the examples, figures and tables described below.

DESCRIPTION OF THE FIGURES

The powder X-ray diffraction patterns displayed in the figures were recorded on a Siemens D-5000 with monochromatic Cu K alpha-1 radiation, a capillary sample holder being used in order to avoid a preferred orientation. The diffraction data were collected using a position-sensitive detector from Braun, in the range from 8 to 96° (2 theta) and with a step width of 0.0678°. Indexing of the powder diagram was effected using the program Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities are plotted along the ordinate.

FIG. 1 further includes the line pattern of the RUB-36 structure for comparison.

FIG. 5 further includes the line pattern of the RUB-36 structure for comparison.

FIG. 5*a* further includes the line pattern of the $SiO_2$ and $H-Al_2O_3-SiO_2$ structures for comparison.

FIG. 7*a* further includes the line pattern of the $SiO_2$ and $H-Al_2O_3-SiO_2$ structures for comparison.

EXAMPLES

Example 1

Preparation of RUB-36

Figure 1:
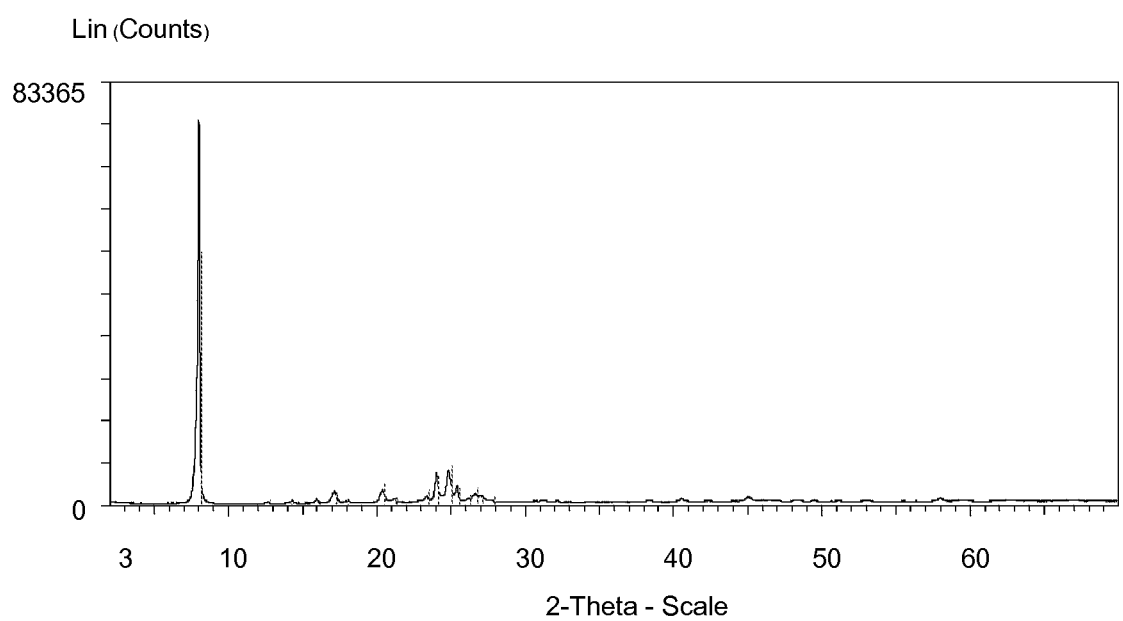
FIG. 1 shows the X-ray diffraction pattern of RUB-36 obtained according to Example 1.
Figure 2:
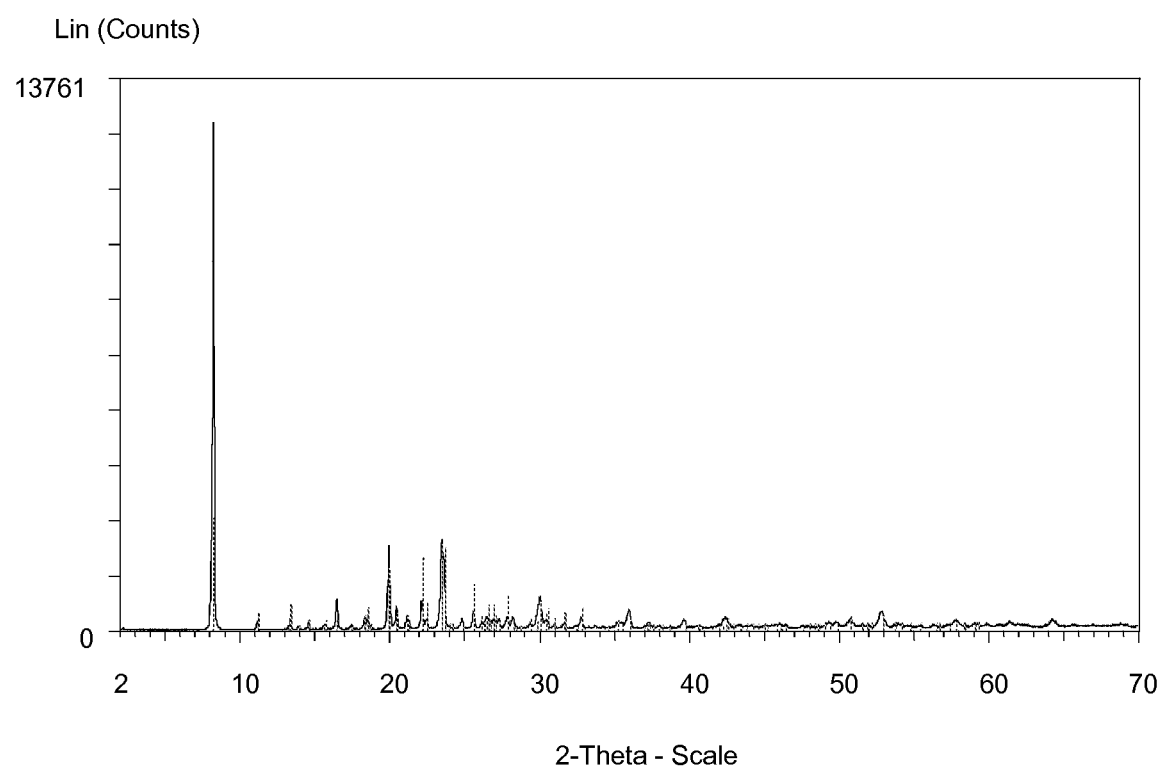
FIG. 2 show the X-ray diffraction pattern of RUB-39 obtained according to Examples 2, respectively. These Figures further include the line pattern of the RUB-39 structure for comparison.
Figure 3:
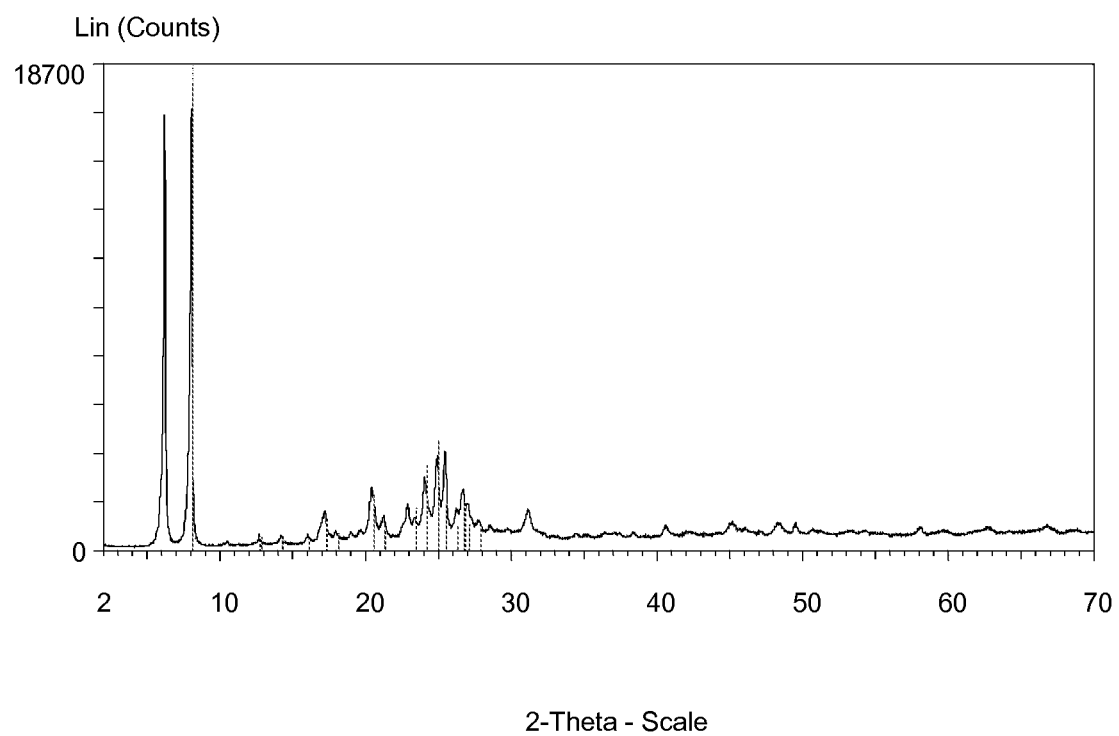
FIG. 3 shows the X-ray diffraction pattern of BLS-1 obtained according to Example 3.
Figure 4:
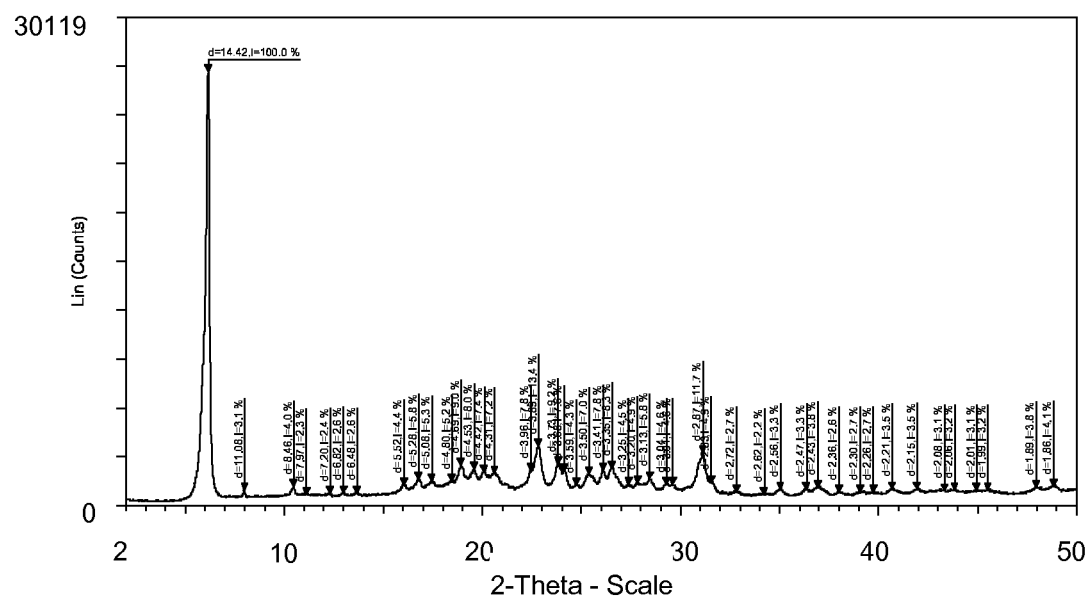
FIG. 4 shows the X-ray diffraction pattern of BLS-3 obtained according to Example 4.
Figure 5A:
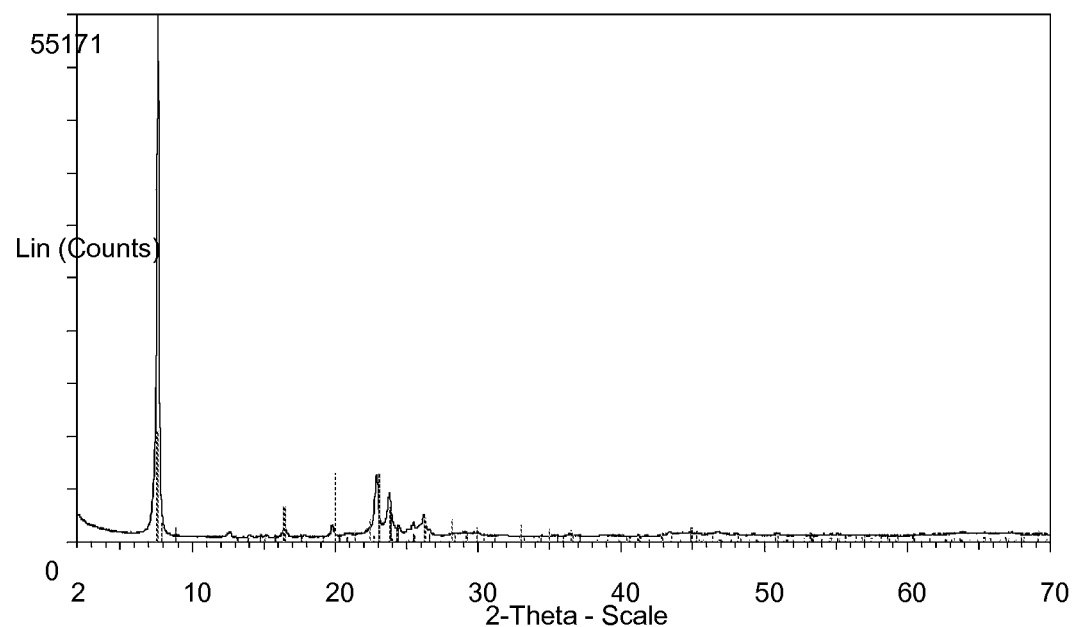
FIG. 5*a* shows the X-ray diffraction pattern of the pillared silicate obtained according to Example 5.
Figure 5B:
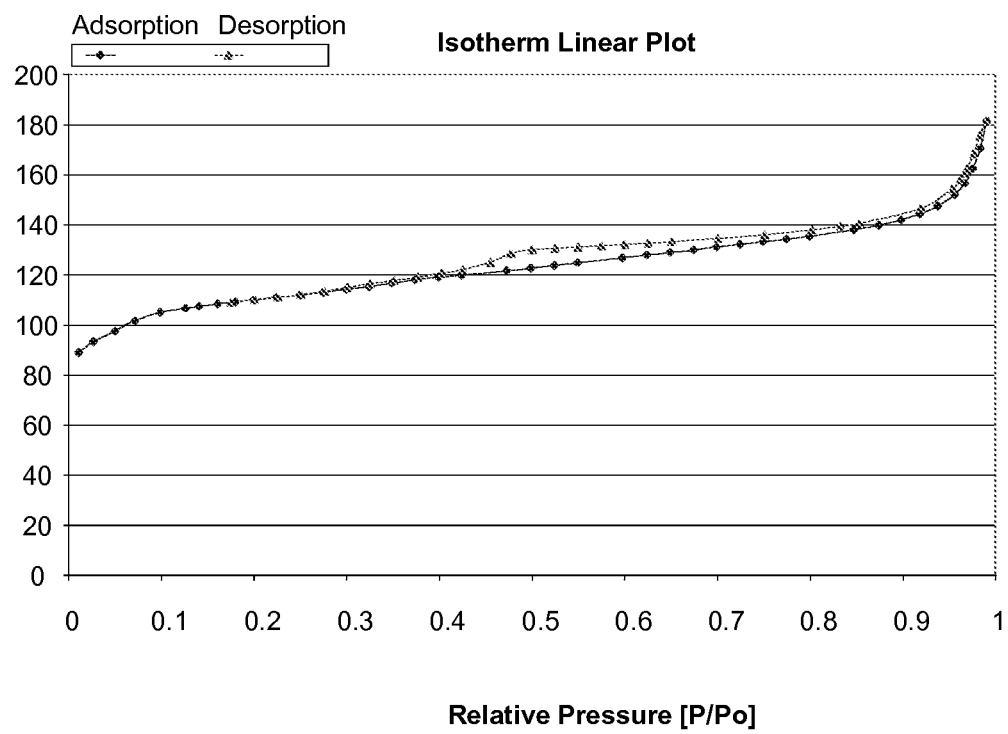
FIGS. 5*b*, 7*b*, 9*b*, 10*b*, 11*b*, 12*b*, 13*b*, 14*b*, 17*b* show the nitrogen adsorption isotherms according to Examples 5, 7, 9, 10, 11, 12, 13, 14, and 17, respectively. In these figures, the relative pressure $p/p^0$ is plotted along the abscissa and the pore volume in ml/g (STP (standard pressure and temperature)), determined according to DIN 66134 at 77 K, is plotted along the ordinate.
Figure 6:
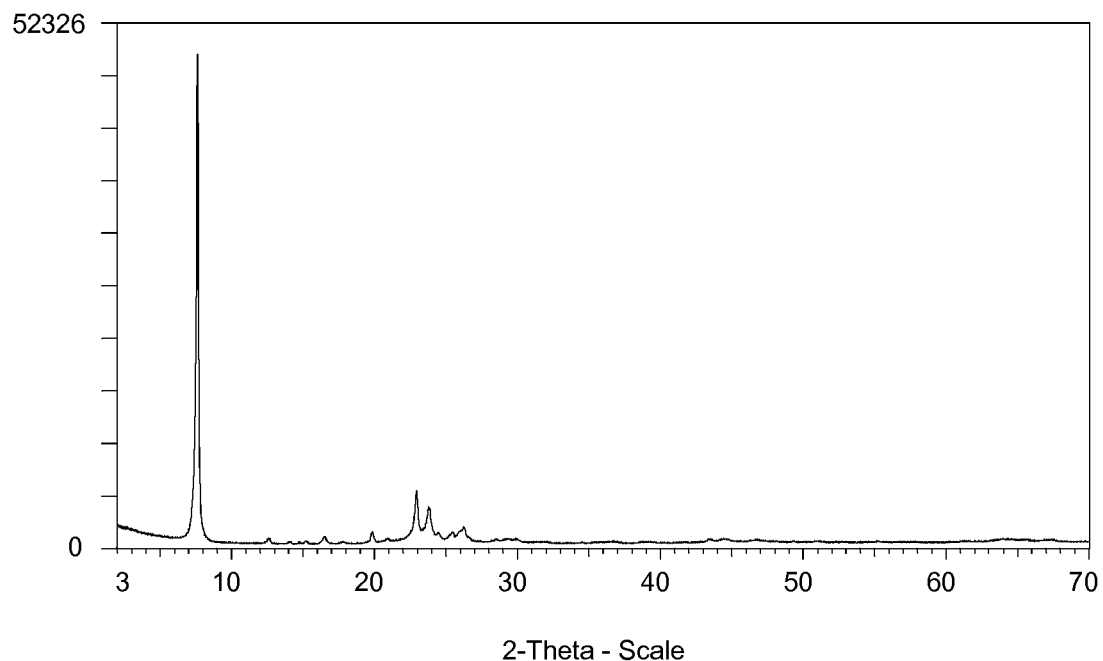
FIG. 6 shows the X-ray diffraction pattern of the pillared silicate obtained according to Example 6.

651.6 g of aqueous diethyldimethylammonium hydroxide (20.62 wt.-%) solution were weighed into a beaker, to which 136.5 g of amorphous silica (Aerosil®) were added in portions and the mixture was stirred for 2 h, affording a yellowish suspension. 107.8 g of water were then removed from the resulting mixture using a rotary evaporator, and the concentrated mixture was stirred for 30 min. 169.0 g of the mixture were then weighed into a pressure digestion vessel and then heated therein under hydrothermal conditions at 140° C. for 336 h, thus affording a silvery-white shimmering suspension.

The resulting suspension was then separated by centrifugation and dried at 120° C. for 72 h, thus affording 32.6 g of a white powder.

The synthesis product had the reflections shown in Table 1 in the X-ray diffraction pattern (Cu K alpha 1).

TABLE 1

X-ray diffraction pattern of the RUB-36 silicate

| Diffraction angle 2θ/° [Cu K(alpha 1)] | Intensity (%) |
|---|---|
| 7.95 | 100.0 |
| 12.62 | 0.6 |
| 14.11 | 0.5 |
| 15.92 | 1.3 |
| 17.14 | 3.6 |
| 17.90 | 0.8 |
| 20.36 | 3.7 |
| 21.15 | 1.5 |
| 22.85 | 1.0 |
| 23.34 | 2.1 |
| 23.99 | 8.2 |
| 24.83 | 8.8 |
| 25.40 | 4.6 |
| 26.18 | 1.6 |
| 26.62 | 2.7 |
| 26.97 | 2.2 |
| 27.69 | 1.2 |
| 28.42 | 0.6 |
| 28.94 | 0.7 |
| 29.75 | 0.6 |
| 30.67 | 0.8 |
| 31.23 | 0.9 |
| 32.18 | 0.8 |
| 34.42 | 0.7 |
| 36.31 | 0.7 |
| 37.49 | 0.6 |
| 38.39 | 1.1 |
| 40.56 | 1.5 |
| 42.37 | 0.8 |
| 44.10 | 0.8 |
| 45.10 | 1.8 |
| 46.51 | 1.1 |
| 47.11 | 0.9 |
| 48.38 | 1.2 |
| 49.50 | 1.1 |

Example 2

Preparation of an RUB-39 Silicate 17.2 g of sodium hydroxide were dissolved in 458.6 g of water, to which 1306.8 g of aqueous dimethyldipropylammonium hydroxide (39 wt.-%) solution were then added, and the resulting solution was stirred for 10 min. 17.2 g of seed crystals of RUB-39 were then added and the resulting mixture stirred for an additional 20 min. 417.0 g of amorphous silica (Aerosil®) were then added in portions to the solution and the mixture was stirred for 1 h. 1100.4 g of the resulting mixture were then weighed into a pressure digestion vessel and then heated therein under hydrothermal conditions at 150° C. for 24 h, thus affording a brownish-white shimmering suspension containing white solid particles.

9.1 g of sodium aluminate were then dissolved in 333.6 g of water and stirred for 20 min. The solution was then added to 1025.4 g of the suspension obtained in the foregoing and the resulting mixture was stirred for 30 min. 333.6 g of water were then removed from the mixture using a rotary evaporator, and the concentrated mixture was then transferred to a pressure digestion vessel and then heated therein under hydrothermal conditions at 140° C. for 48 h, thus affording a brownish-white shimmering suspension with small solid particles.

The reaction product was then separated by suction filtration and washed with 3 liters of distilled water. The product was then dried at 120° C. for 16 h, thus affording 19.7 g of a white powder.

The synthesis product had the reflections shown in Table 2 in the X-ray diffraction pattern (Cu K alpha 1).

TABLE 2

X-ray diffraction pattern of the RUB-39 silicate

| Diffraction angle 2θ/° [Cu K(alpha 1)] | Intensity (%) |
|---|---|
| 8.23 | 100.00 |
| 11.19 | 1.70 |
| 13.38 | 2.30 |
| 13.88 | 0.80 |
| 14.60 | 1.80 |
| 15.54 | 0.90 |
| 15.71 | 1.20 |
| 16.48 | 6.20 |
| 17.41 | 1.20 |
| 18.30 | 2.30 |
| 18.53 | 2.50 |
| 19.96 | 16.70 |
| 20.46 | 4.60 |
| 21.16 | 3.00 |
| 22.17 | 5.70 |
| 22.46 | 2.20 |
| 23.49 | 18.00 |
| 23.60 | 15.10 |
| 24.22 | 0.80 |
| 24.82 | 2.30 |
| 25.61 | 3.70 |
| 26.14 | 1.70 |
| 26.48 | 2.50 |
| 26.92 | 2.10 |
| 27.30 | 2.30 |
| 27.84 | 2.70 |
| 28.22 | 2.50 |
| 29.39 | 1.50 |
| 30.03 | 6.50 |
| 30.44 | 2.20 |
| 30.98 | 1.10 |
| 31.36 | 0.60 |
| 31.68 | 1.40 |
| 32.43 | 0.90 |
| 32.80 | 2.40 |
| 33.34 | 0.70 |
| 33.75 | 0.90 |
| 34.23 | 0.80 |
| 34.60 | 0.70 |
| 35.38 | 1.60 |
| 35.97 | 4.10 |
| 37.28 | 1.60 |
| 38.00 | 0.80 |
| 38.74 | 0.70 |
| 39.68 | 2.10 |
| 40.56 | 1.00 |
| 42.46 | 2.60 |
| 43.33 | 1.10 |
| 43.87 | 1.00 |
| 44.18 | 1.20 |
| 45.21 | 1.00 |
| 46.03 | 1.30 |
| 46.52 | 1.10 |
| 47.59 | 0.90 |
| 47.98 | 1.00 |
| 49.34 | 1.60 |
| 49.88 | 1.60 |

Example 3

Preparation of a Layered Silicate BLS-1

1139.7 g of aqueous diethyldimethylammonium hydroxide (20.62 wt.-%) solution were weighed into a beaker, to which 238.9 g of amorphous silica (Aerosil®) were added in portions and the mixture was stirred for 2 h, affording a yellowish suspension. 188.6 g of water were then removed from the resulting mixture using a rotary evaporator, and the concentrated mixture was stirred for 1 h. 172.5 g of the mixture were then weighed into a pressure digestion vessel and then heated therein under hydrothermal conditions at 140° C. for 208 h. The resulting silvery-white shimmering suspension was then separated by centrifugation, washed with distilled water to pH 7, and dried at 120° C. for 24 h, thus affording 31.8 g of a white powder. The synthesis product had the reflections shown in Table 3 in the X-ray diffraction pattern (Cu K alpha 1).

TABLE 3

X-ray diffraction pattern of the novel layered silicate

| Diffraction angle 2θ/° [Cu K(alpha 1)] | Intensity (%) |
|---|---|
| 6.19 | 98.5 |
| 8.00 | 100.0 |
| 10.47 | 1.7 |
| 12.34 | 1.5 |
| 12.69 | 3.1 |
| 14.18 | 3.0 |
| 16.00 | 3.2 |
| 17.18 | 8.1 |
| 17.95 | 4.0 |
| 18.98 | 3.8 |
| 19.62 | 4.4 |
| 20.40 | 14.1 |
| 21.22 | 7.4 |
| 22.53 | 5.6 |
| 22.88 | 10.2 |
| 23.36 | 7.2 |
| 24.05 | 15.9 |
| 24.91 | 21.2 |
| 25.44 | 22.3 |
| 26.23 | 9.1 |

TABLE 3-continued

X-ray diffraction pattern of the novel layered silicate

| Diffraction angle 2θ/° [Cu K(alpha 1)] | Intensity (%) |
|---|---|
| 26.66 | 13.4 |
| 26.98 | 10.3 |
| 27.76 | 6.4 |
| 28.56 | 5.3 |
| 29.75 | 4.6 |
| 31.15 | 8.8 |
| 32.93 | 2.9 |
| 34.47 | 3.3 |
| 35.22 | 3.0 |
| 36.45 | 3.6 |
| 37.13 | 3.7 |
| 38.39 | 3.6 |
| 40.60 | 5.2 |
| 42.18 | 3.8 |
| 44.20 | 3.6 |
| 45.17 | 5.9 |
| 46.10 | 4.6 |
| 46.53 | 4.0 |
| 47.14 | 3.9 |
| 48.39 | 5.7 |
| 49.57 | 5.9 |
| 50.75 | 4.4 |

Example 4

Preparation of a Layered Silicate BLS-3

1628.2 g of aqueous diethyldimethylammonium hydroxide (20.62 wt.-%) solution were weighed into a beaker, to which 341.2 g of amorphous silica (Aerosil®) were added in portions and the mixture was stirred for 2 h, thus affording a yellowish suspension.

The resulting mixture was placed into a pressure digestion vessel, was let stand for 24 h, and then subsequently heated under hydrothermal conditions at 140° C. for 192 h. The resulting silvery-white shimmering suspension displayed a pH of 12.57.

The solid reaction product was then separated by suction filtration, first washed with the filtrate and then with 9 liters of distilled water to 105 µS/cm with respect to the conductivity of the washing solution. The product was then dried at 120° C. for 24 h, thus affording 205.0 g of a white powder.

The synthesis product had the reflections shown in Table 4 in the X-ray diffraction pattern (Cu K alpha 1).

TABLE 4

X-ray diffraction pattern of the novel layered silicate

| Diffraction angle 2θ/° [Cu K(alpha 1)] | Intensity (%) |
|---|---|
| 6.12 | 100.0 |
| 7.97 | 3.1 |
| 10.44 | 4.0 |
| 11.09 | 2.3 |
| 12.28 | 2.4 |
| 12.97 | 2.6 |
| 13.65 | 2.6 |
| 16.04 | 4.4 |
| 16.78 | 5.8 |
| 17.43 | 5.3 |
| 18.46 | 5.2 |
| 18.90 | 9.0 |
| 19.57 | 8.0 |
| 20.09 | 7.4 |
| 20.61 | 7.2 |
| 22.44 | 7.8 |
| 22.84 | 13.4 |
| 23.84 | 9.2 |
| 24.15 | 7.6 |
| 24.76 | 4.3 |
| 25.39 | 7.0 |
| 26.10 | 7.8 |
| 26.55 | 8.3 |
| 27.39 | 4.5 |
| 27.87 | 4.9 |
| 28.48 | 5.8 |
| 29.32 | 4.6 |
| 29.64 | 4.6 |
| 31.15 | 11.7 |
| 31.58 | 4.9 |
| 32.85 | 2.7 |
| 34.24 | 2.2 |
| 35.07 | 3.3 |
| 36.38 | 3.3 |
| 36.97 | 3.8 |
| 38.06 | 2.6 |
| 39.12 | 2.7 |
| 39.77 | 2.7 |
| 40.73 | 3.5 |
| 42.00 | 3.5 |
| 43.38 | 3.1 |
| 43.89 | 3.2 |
| 45.00 | 3.1 |
| 45.57 | 3.2 |
| 48.02 | 3.8 |
| 48.90 | 4.1 |

Example 5

Preparation of a Pillared RUB-36 Silicate Using Chlorotrimethylsilane 50.2 g of 1 M hydrochloric acid and 2.8 g of RUB-36 from Example 1 were added to 116.5 g of distilled water and the resulting was stirred for 5 min. 0.5 g of chlorotrimethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 2.4 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.1 g of a white powder.

The synthesis product had the reflections shown in Table 5 in the X-ray diffraction pattern (Cu K alpha 1).

TABLE 5

X-ray diffraction pattern of the novel pillared silicate

| Diffraction angle 2θ/° [Cu K(alpha 1)] | Intensity (%) |
|---|---|
| 7.59 | 100.0 |
| 9.83 | 0.9 |
| 12.61 | 1.8 |
| 14.00 | 1.1 |
| 14.76 | 1.0 |
| 15.21 | 1.0 |
| 16.49 | 2.3 |
| 17.79 | 1.0 |

TABLE 5-continued

X-ray diffraction pattern of the novel pillared silicate

| Diffraction angle 2θ/° [Cu K(alpha 1)] | Intensity (%) |
|---|---|
| 19.82 | 3.0 |
| 20.90 | 1.4 |
| 22.89 | 12.4 |
| 23.79 | 9.2 |
| 24.43 | 2.8 |
| 25.12 | 2.2 |
| 25.46 | 3.3 |
| 26.23 | 5.0 |
| 26.58 | 2.1 |
| 28.44 | 1.4 |
| 29.12 | 1.7 |
| 29.87 | 1.6 |
| 31.81 | 1.1 |
| 34.45 | 0.9 |
| 35.50 | 1.0 |
| 36.40 | 1.2 |
| 36.99 | 1.0 |
| 38.74 | 1.0 |
| 39.25 | 1.0 |
| 41.72 | 1.0 |
| 43.47 | 1.6 |
| 44.65 | 1.6 |
| 46.76 | 1.7 |
| 48.07 | 1.2 |
| 49.25 | 1.2 |

Measurement with Nitrogen

A pulverulent, freshly calcined sample of the tectosilicate obtained according to example 7 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 7A:
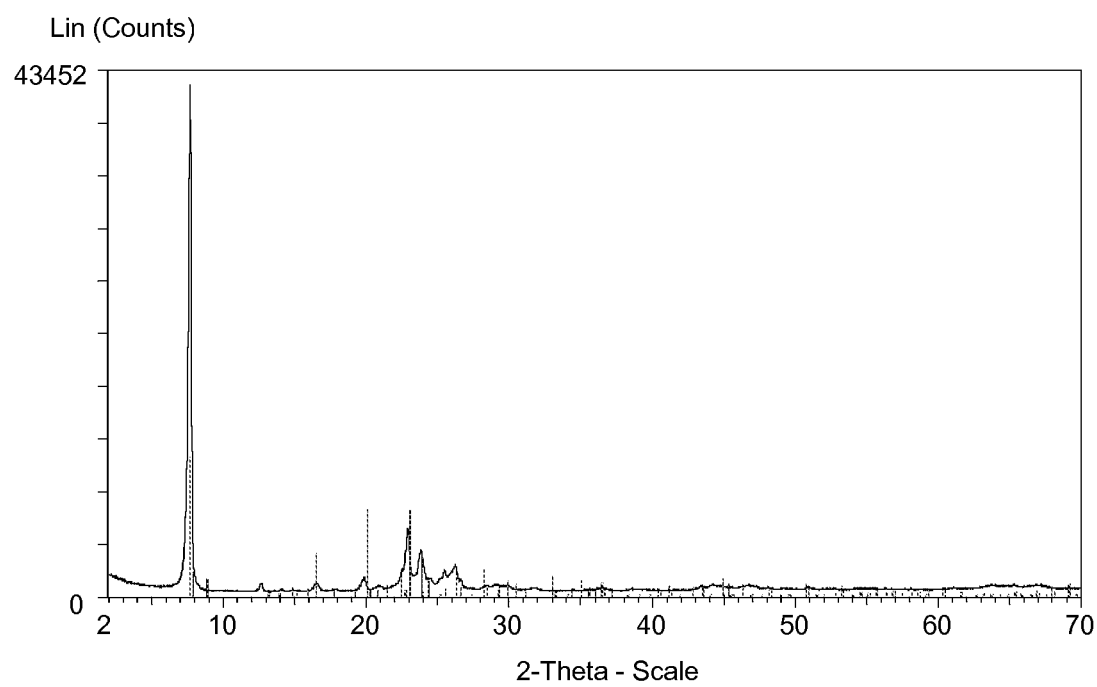
FIG. 7*a* shows the X-ray diffraction pattern of the pillared silicate obtained according to Example 7.
Figure 7B:
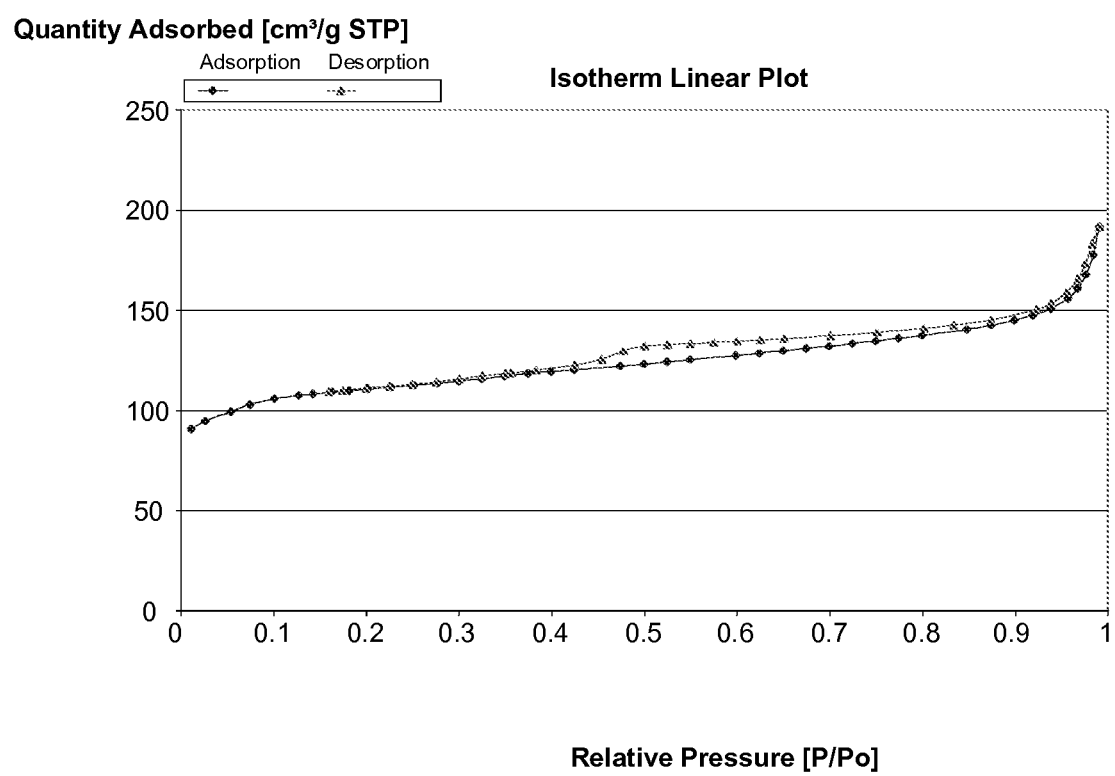
Figure 8:
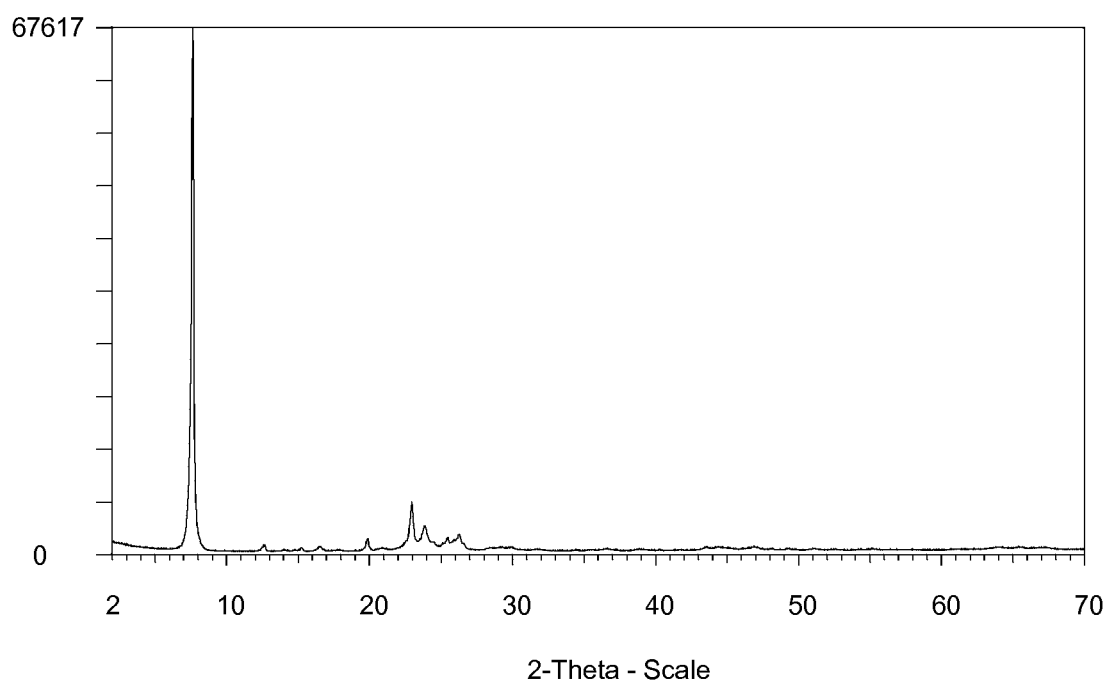
FIGS. 8, 9*a*, 10*a*, and 11*a* show the X-ray diffraction patterns of the pillared silicates obtained according to Examples 8, 9, 10, and 11, respectively.

FIG. 7b shows the isotherm obtained. The step-like curve of a type I adsorption isotherm typical of microporous solids is evident (cf. DIN 66135). The evaluation of the data gave an equivalent surface of 499.68 m²/g according to the Langmuir method, and a BET surface area of 380.50 m²/g.

Example 6

Preparation of a Pillared RUB-36 Silicate Using Ethoxytrimethylsilane 50.2 g of 1 M hydrochloric acid and 2.8 g of RUB-36 from Example 1 were added to 116.5 g of distilled water and the resulting was stirred for 5 min. 0.5 g of ethoxytrimethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 3 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.1 g of a white powder.

Measurement with Nitrogen

A pulverulent, freshly calcined sample of the tectosilicate obtained according to example 8 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

The evaluation of the data gave a BET surface area of 423.4 m²/g and a surface area of 572.8 m²/g according to the Langmuir method.

Example 7

Preparation of a Pillared RUB-36 Silicate Using Triethylsilane 50.2 g of 1 M hydrochloric acid and 2.8 g of RUB-36 from Example 1 were added to 116.6 g of distillated water and the resulting was stirred for 5 min. 0.4 g of triethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 1.2 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.2 g of a white powder.

The synthesis product had the reflections shown in Table 6 in the X-ray diffraction pattern (Cu K alpha 1).

TABLE 6

X-ray diffraction pattern of the novel pillared silicate

| Diffraction angle 2θ/° [Cu K(alpha 1)] | Intensity (%) |
|---|---|
| 7.59 | 100.0 |
| 12.59 | 2.3 |
| 13.51 | 1.0 |
| 14.02 | 1.3 |
| 14.80 | 1.2 |
| 15.19 | 1.0 |
| 16.48 | 2.4 |
| 17.77 | 1.4 |
| 19.83 | 3.7 |
| 20.88 | 1.9 |
| 22.87 | 13.1 |
| 23.79 | 9.0 |
| 24.44 | 3.5 |
| 25.10 | 3.3 |
| 25.45 | 5.0 |
| 25.84 | 4.4 |
| 26.19 | 6.0 |
| 26.56 | 3.0 |
| 28.38 | 2.1 |
| 29.06 | 2.3 |
| 29.87 | 1.9 |
| 31.76 | 1.5 |
| 34.47 | 1.2 |
| 35.61 | 1.4 |
| 36.44 | 1.6 |
| 38.95 | 1.3 |
| 41.69 | 1.3 |
| 43.48 | 1.9 |
| 44.34 | 2.0 |
| 46.78 | 2.1 |
| 47.26 | 1.8 |
| 48.12 | 1.5 |
| 49.25 | 1.6 |
| 49.72 | 1.5 |

Measurement with Nitrogen

A pulverulent, freshly calcined sample of the tectosilicate obtained according to Example 9 (about 40 mg) was weighed in and was degassed overnight at 120° C. and a reduced pressure of about 10⁻⁶ MPa. The measurement was then effected with nitrogen at 77 K on a volumetric sorption apparatus (Autosorb AS-6, from Quantachrome).

Figure 9A:
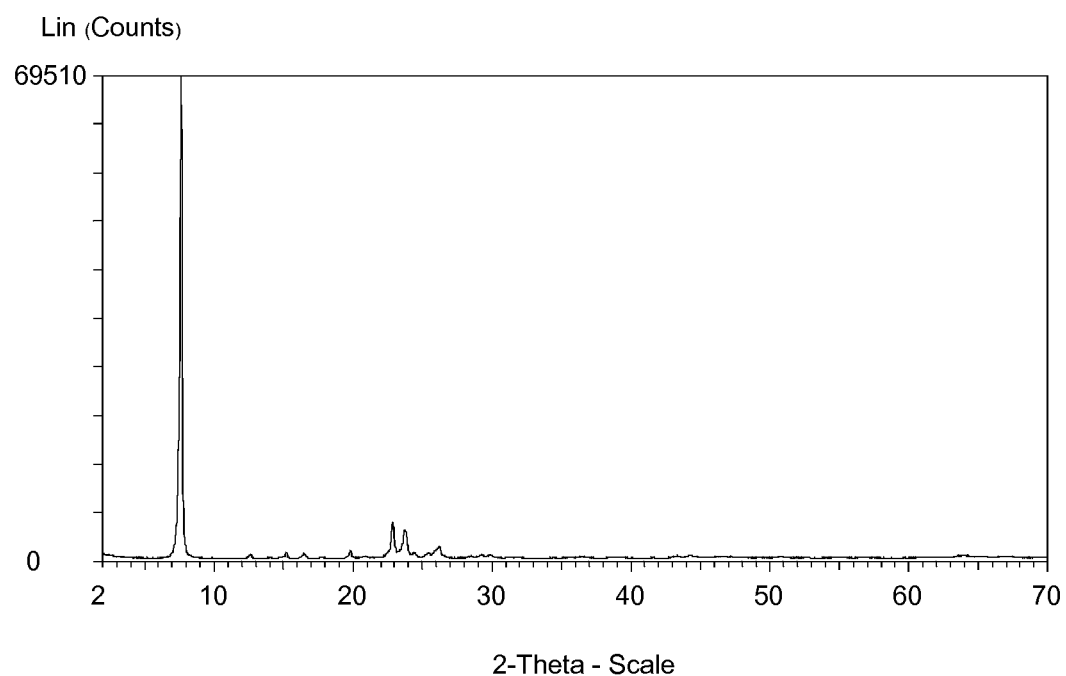
Figure 9B:
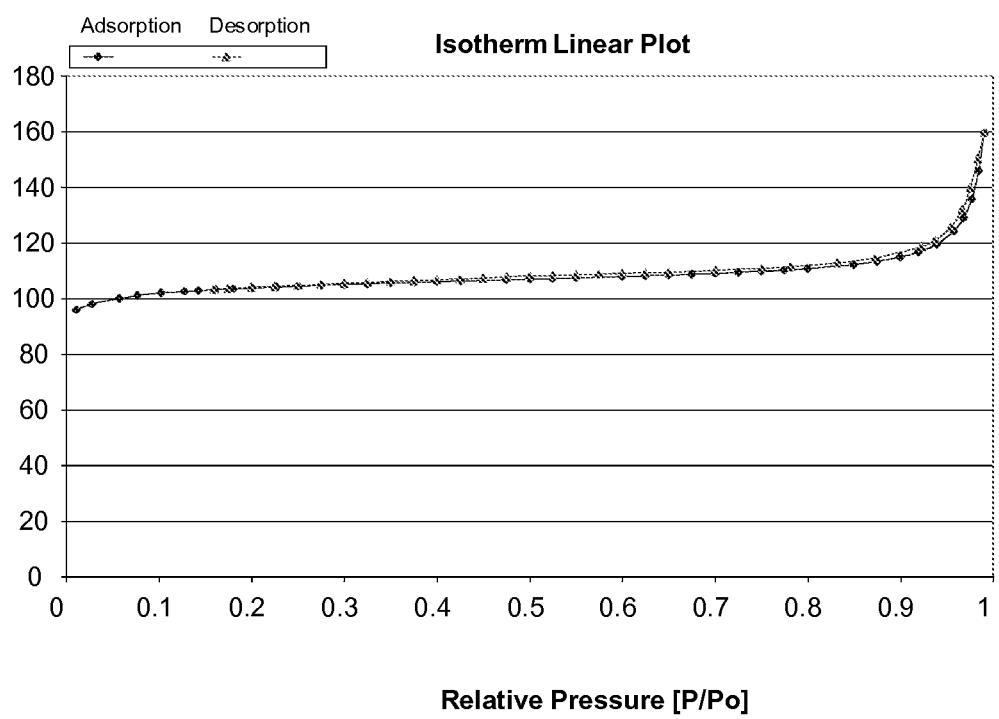
Figure 10A:
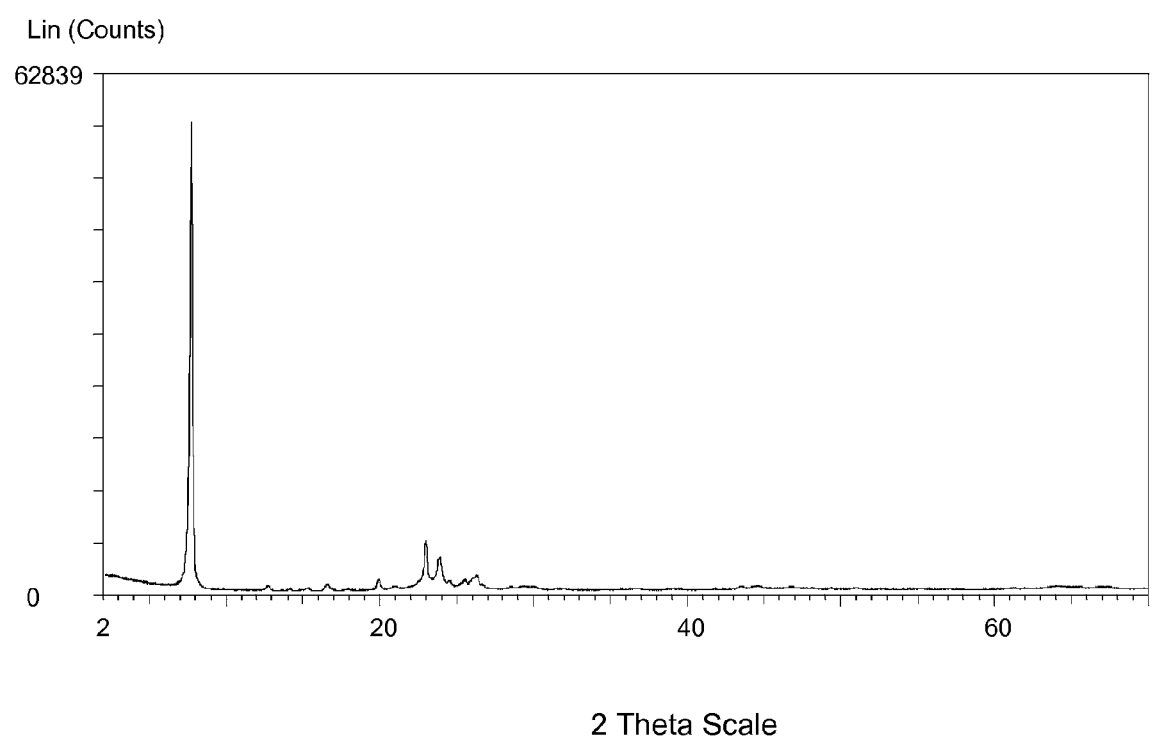
Figure 10B:
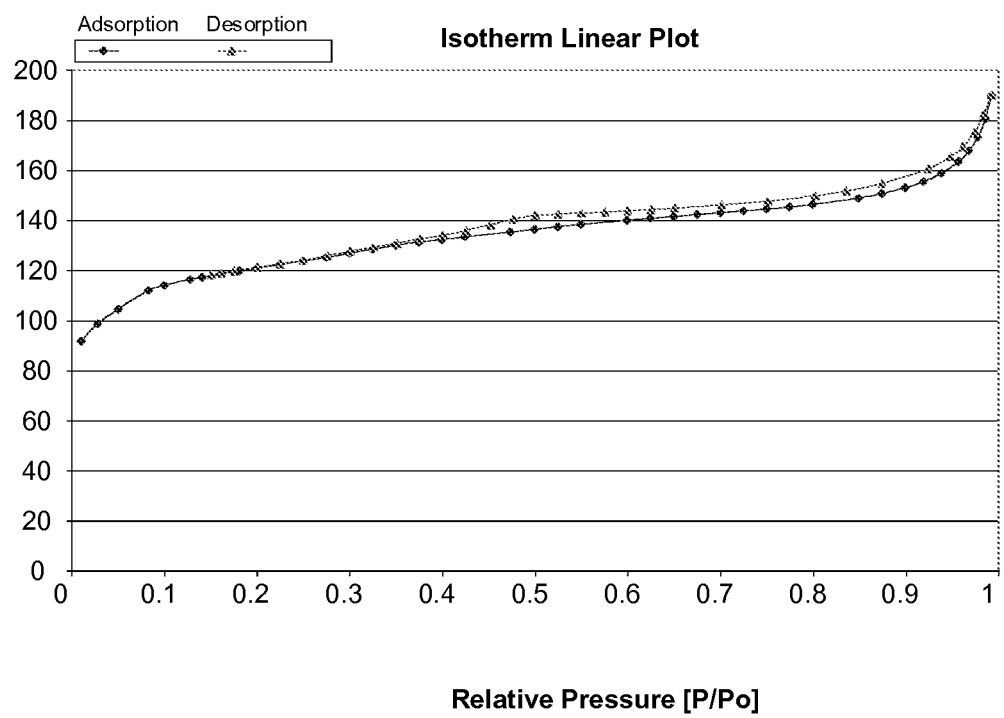

FIG. 9b shows the isotherm obtained. The step-like curve of a type I adsorption isotherm typical of microporous solids is evident (cf. DIN 66135). The evaluation of the data gave an equivalent surface of 502.30 m²/g according to the Langmuir method, and a BET surface area of 380.53 m²/g.

Example 8

Preparation of a Pillared RUB-36 Silicate Using Triethylchlorosilane 50.1 g of 1 M hydrochloric acid and 2.8 g of RUB-36 from Example 1 were added to 116.4 g of distilled water and the resulting was stirred for 5 min. 0.7 g of triethylchlorosilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 3 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.2 g of a white powder.

The synthesis product had the reflections shown in Table 7 in the X-ray diffraction pattern (Cu K alpha 1).

TABLE 7

| X-ray diffraction pattern of the novel pillared silicate | |
| --- | --- |
| Diffraction angle 2θ/° [Cu K(alpha 1)] | Intensity (%) |
| 7.60 | 100.0 |
| 12.59 | 1.9 |
| 14.11 | 1.2 |
| 14.79 | 1.0 |
| 15.23 | 1.3 |
| 16.51 | 2.2 |
| 17.81 | 1.1 |
| 19.84 | 3.1 |
| 20.92 | 1.8 |
| 22.94 | 11.4 |
| 23.81 | 8.1 |
| 24.47 | 3.0 |
| 25.27 | 2.6 |
| 25.44 | 3.1 |
| 26.01 | 3.4 |
| 26.24 | 4.1 |
| 26.60 | 2.1 |
| 28.50 | 1.7 |
| 29.36 | 1.8 |
| 29.96 | 1.6 |
| 31.42 | 1.2 |
| 31.99 | 1.1 |
| 34.55 | 1.0 |
| 35.60 | 1.0 |
| 36.66 | 1.2 |
| 38.71 | 1.2 |
| 39.29 | 1.1 |
| 41.73 | 1.0 |
| 43.44 | 1.6 |
| 44.49 | 1.7 |

TABLE 7-continued

| X-ray diffraction pattern of the novel pillared silicate | |
| --- | --- |
| Diffraction angle 2θ/° [Cu K(alpha 1)] | Intensity (%) |
| 46.78 | 1.5 |
| 48.16 | 1.3 |
| 49.34 | 1.2 |

Measurement with Nitrogen

A pulverulent, freshly calcined sample of the tectosilicate obtained according to example 10 (about 40 mg) was weighed in and was degassed overnight at 120° C. and a reduced pressure of about 10⁻⁶ MPa. The measurement was then effected with nitrogen at 77 K on a volumetric sorption apparatus (Autosorb AS-6, from Quantachrome).

The evaluation of the data gave a BET surface area of 384.4 m²/g and a surface area of 521.7 m²/g according to the Langmuir method.

Example 9

Preparation of a Pillared RUB-36 Silicate Using Dichlorodimethylsilane 50.2 g of 1 M hydrochloric acid and 2.8 g of RUB-36 from Example 1 were added to 116.5 g of distilled water and the resulting was stirred for 5 min. 0.6 g of dichlorodimethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 3 liters of distilled water to pH=7 of the washing solution. The product was then heated to 120° C. in 1 h and held at that temperature for 15 h.

The product thus obtained was then calcined by heating to 500° C. at a rate of 1° C./min and maintaining said temperature for 12 h, thus affording 2.3 g of a white powder.

The synthesis product had the reflections shown in Table 8 in the X-ray diffraction pattern (Cu K alpha 1).

TABLE 8

| X-ray diffraction pattern of the novel pillared silicate | |
| --- | --- |
| Diffraction angle 2θ/° [Cu K(alpha 1)] | Intensity (%) |
| 7.60 | 100.0 |
| 12.60 | 1.1 |
| 14.02 | 0.5 |
| 14.78 | 0.6 |
| 15.19 | 1.4 |
| 16.46 | 1.2 |
| 17.75 | 0.5 |
| 19.82 | 1.9 |
| 20.54 | 0.5 |
| 20.88 | 0.7 |
| 22.88 | 7.7 |
| 23.74 | 6.2 |
| 24.45 | 1.5 |
| 25.46 | 1.6 |
| 25.91 | 1.9 |
| 26.20 | 2.8 |
| 26.59 | 0.9 |
| 28.54 | 0.8 |
| 29.26 | 1.0 |
| 29.86 | 1.0 |
| 31.28 | 0.5 |

TABLE 8-continued

X-ray diffraction pattern of the novel pillared silicate

| Diffraction angle 2θ/° [Cu K(alpha 1)] | Intensity (%) |
|---|---|
| 31.92 | 0.5 |
| 34.48 | 0.4 |
| 35.61 | 0.4 |
| 36.55 | 0.6 |
| 38.77 | 0.5 |
| 39.32 | 0.5 |
| 41.65 | 0.4 |
| 43.35 | 0.8 |
| 44.34 | 1.0 |

Measurement with Nitrogen

A pulverulent, freshly calcined sample of the tectosilicate obtained according to example 11 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 11A:
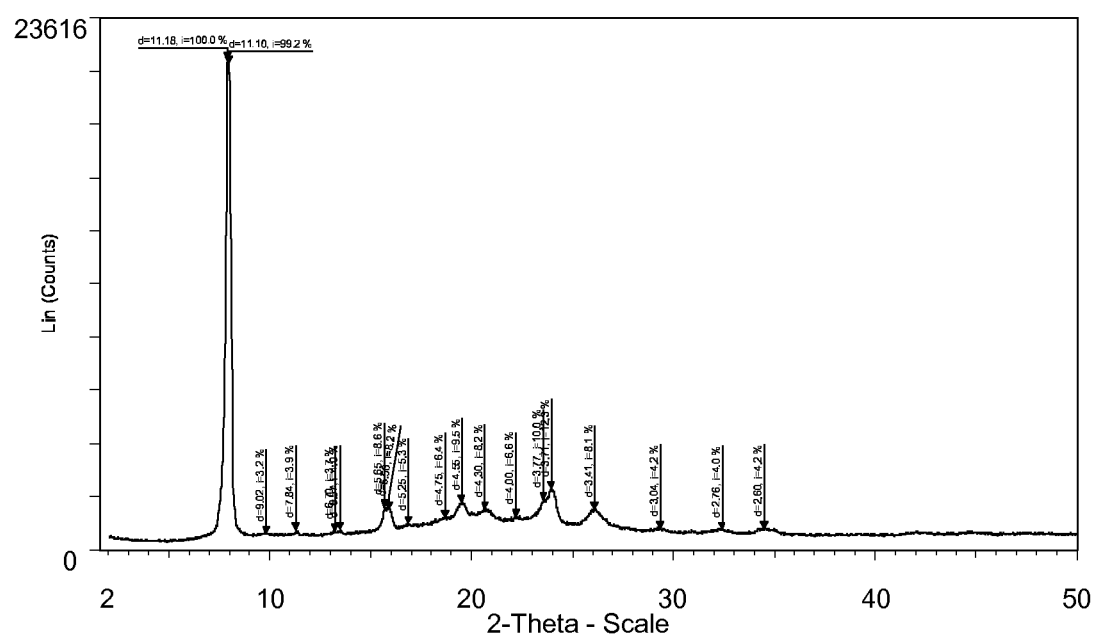
Figure 11B:
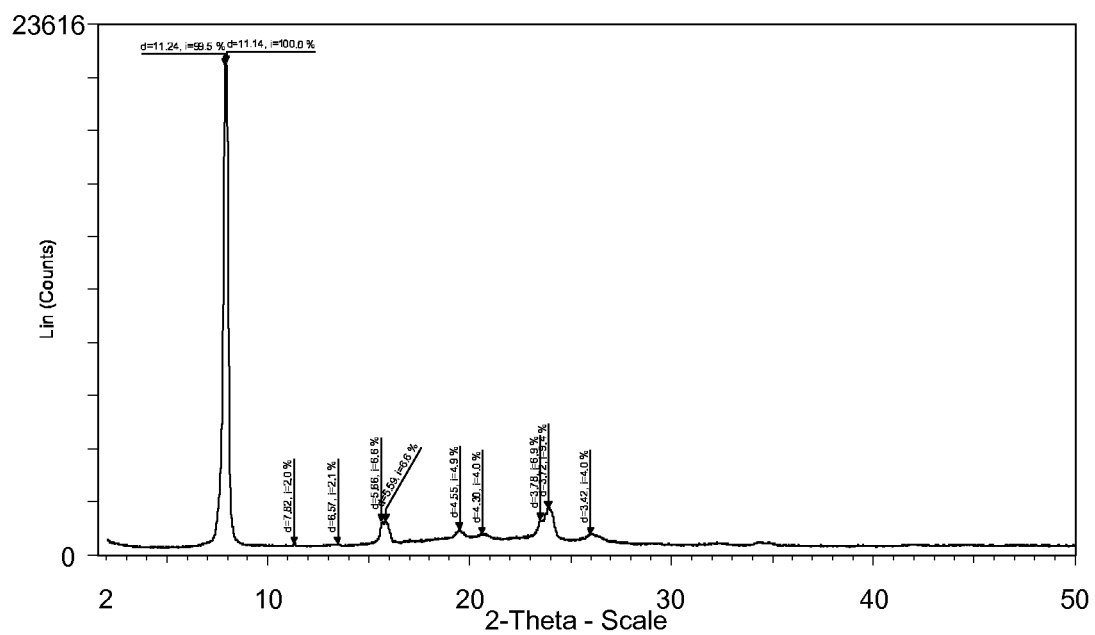

FIG. 11b shows the isotherm obtained. The step-like curve of a type I adsorption isotherm typical of microporous solids is evident (cf. DIN 66135). The evaluation of the data gave an equivalent surface of 458.96 m$^2$/g according to the Langmuir method, and a BET surface area of 350.58 m$^2$/g.

Example 10

Preparation of a Pillared RUB-36 Silicate Using Hexamethyldisilane 50.2 g of 1 M hydrochloric acid and 2.8 g of RUB-36 from Example 1 were added to 116.4 g of distilled water and the resulting was stirred for 5 min. 0.7 g of hexadimethylsilane were then added and the solution was stirred for 15 min. The mixture was then transferred to a pressure digestion vessel and then heated therein under hydrothermal conditions at 170° C. for 24 h, thus affording a clear solution containing a white precipitate. The solid reaction product was then separated by suction filtration, first washed with the filtrate and then with 1 liter of distilled water to pH=7 of the washing solution. The product was then heated to 120° C. in 1 h and held at that temperature for 15 h. The product thus obtained was then calcined by heating to 500° C. in 7 h and maintaining said temperature for 15 h, thus affording 2.1 g of a white powder.

The synthesis product had the reflections shown in Table 9 in the X-ray diffraction pattern (Cu K alpha 1).

TABLE 9

X-ray diffraction pattern of the novel pillared silicate

| Diffraction angle 2θ/° [Cu K(alpha 1)] | Intensity (%) |
|---|---|
| 7.63 | 100.00 |
| 12.65 | 1.70 |
| 14.10 | 1.00 |
| 14.84 | 0.90 |
| 15.27 | 1.40 |
| 16.53 | 2.00 |
| 17.82 | 1.00 |
| 19.90 | 3.00 |
| 20.93 | 1.50 |
| 22.96 | 11.20 |
| 23.85 | 7.50 |
| 24.51 | 2.70 |
| 25.20 | 2.10 |
| 25.51 | 2.90 |
| 26.01 | 3.10 |
| 26.26 | 3.80 |
| 26.64 | 1.90 |
| 28.57 | 1.50 |
| 29.37 | 1.60 |
| 29.97 | 1.50 |
| 31.41 | 1.00 |
| 31.93 | 1.00 |
| 34.47 | 0.90 |
| 35.68 | 0.90 |
| 36.75 | 1.00 |
| 39.11 | 1.00 |
| 41.76 | 1.00 |
| 43.49 | 1.50 |
| 44.56 | 1.60 |
| 46.76 | 1.40 |
| 47.30 | 1.30 |
| 48.21 | 1.20 |

Measurement with Nitrogen

A pulverulent, freshly calcined sample of the tectosilicate obtained according to example 12 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 12A:
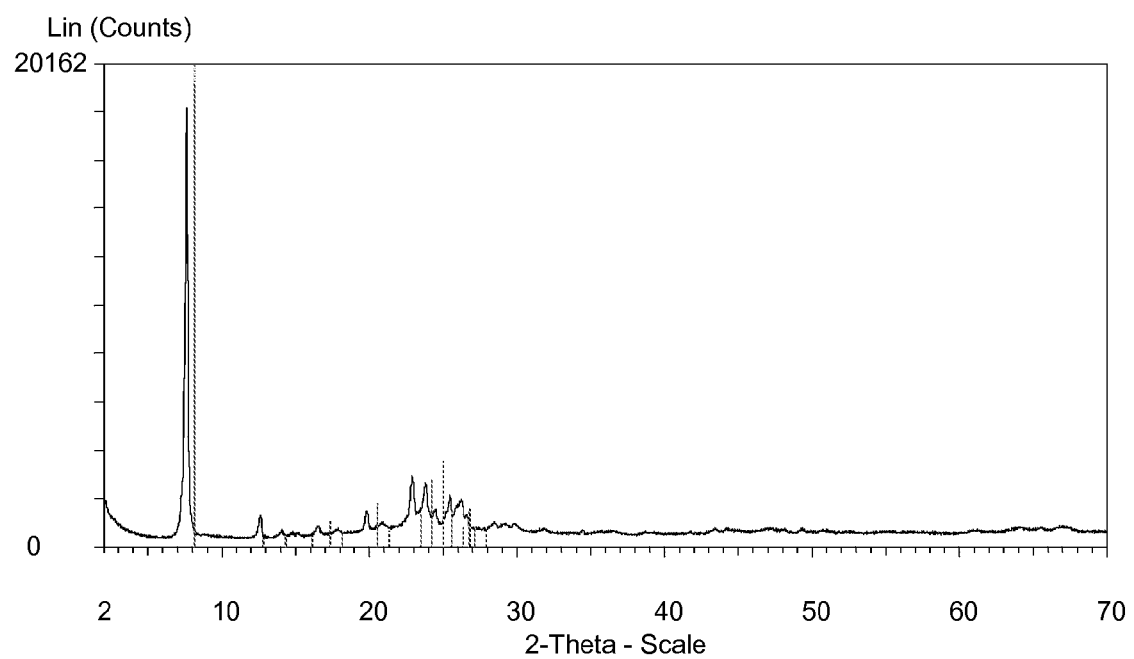
FIGS. 12*a*, 13*a*, and 14*a* show the X-ray diffraction patterns of the pillared silicate obtained according to Examples 12, 13, and 14, respectively. The figures further include the line pattern of the RUB-36 structure for comparison.
Figure 12B:
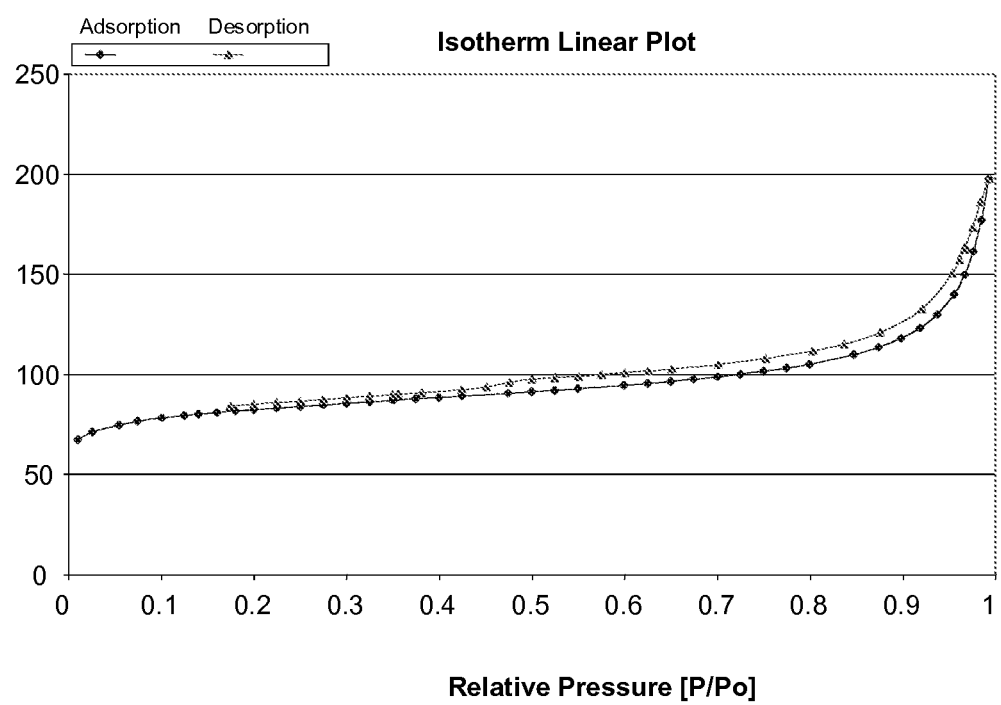
Figure 13A:
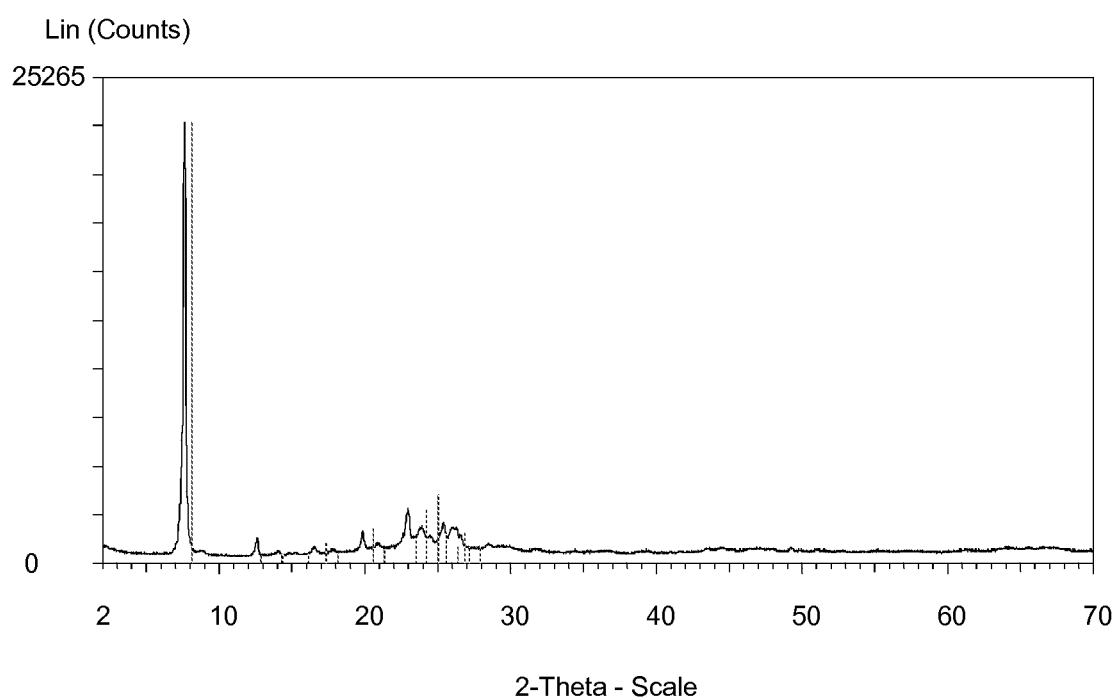
Figure 13B:
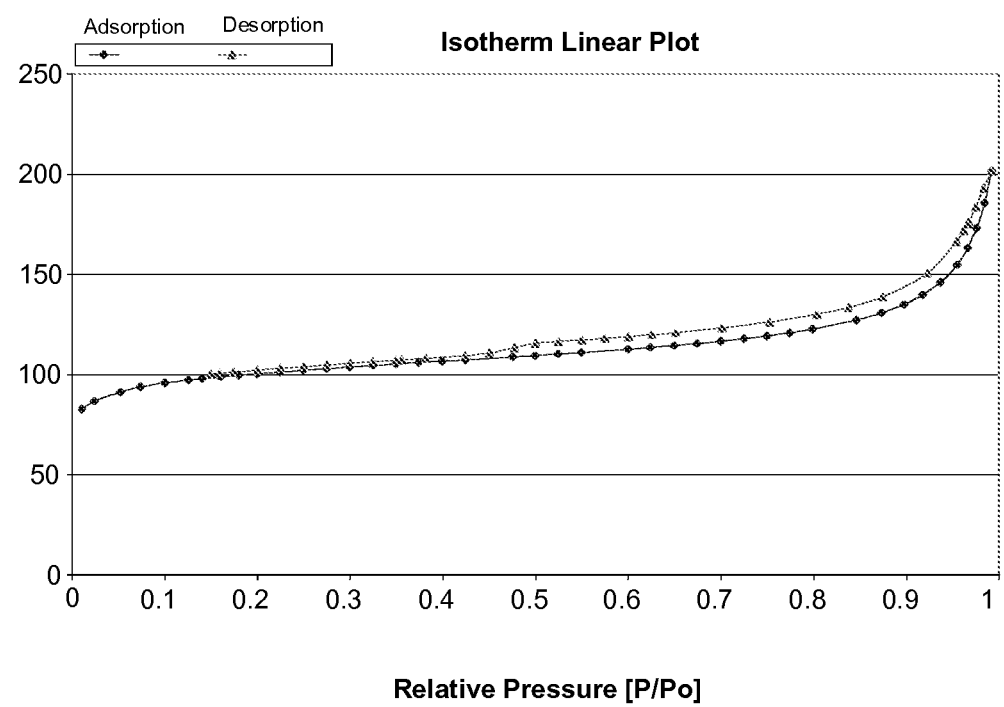

FIG. 12b shows the isotherm obtained. The step-like curve of a type I adsorption isotherm typical of microporous solids is evident (cf. DIN 66135). The evaluation of the data gave an equivalent surface of 554.84 m$^2$/g according to the Langmuir method, and a BET surface area of 419.74 m$^2$/g.

Example 11

Preparation of a Pillared RUB-39 Silicate Using Dichlorodimethylsilane 50.2 g of 1 M hydrochloric acid and 2.8 g of RUB-39 from Example 2 were added to 116.5 g of distilled water and the resulting was stirred for 5 min. 0.6 g of dichlorodimethylsilane were then added and the solution was stirred for 15 min. The mixture was then transferred to a pressure digestion vessel and then heated therein under hydrothermal conditions at 170° C. for 24 h, thus affording a clear solution containing a white precipitate. The solid reaction product was then separated by suction filtration, first washed with the filtrate and then with 2 liters of distilled water to pH=7 of the washing solution. One portion of the product thus obtained (3.2 g) was then heated to 120° C. in 1 h and held at that temperature for 15 h, thus affording 1.2 g of a white powder. The synthesis product had the reflections shown in Table 10 in the X-ray diffraction pattern (Cu K alpha 1).

TABLE 10

X-ray diffraction pattern of the novel pillared silicate prior to calcination

| Diffraction angle 2θ/° [Cu K(alpha 1)] | Intensity (%) |
|---|---|
| 7.90 | 100.0 |
| 7.96 | 99.2 |
| 9.80 | 3.2 |
| 11.28 | 3.9 |
| 13.20 | 3.7 |
| 13.47 | 4.0 |
| 15.69 | 8.6 |

TABLE 10-continued

X-ray diffraction pattern of the novel pillared silicate prior to calcination

| Diffraction angle 2θ/° [Cu K(alpha 1)] | Intensity (%) |
|---|---|
| 15.92 | 8.2 |
| 16.87 | 5.3 |
| 18.67 | 6.4 |
| 19.49 | 9.5 |
| 20.66 | 8.2 |
| 22.20 | 6.6 |
| 23.55 | 10.0 |
| 23.94 | 2.3 |
| 26.09 | 8.1 |
| 29.34 | 4.2 |
| 32.41 | 4.0 |
| 34.49 | 4.2 |
| 7.90 | 100.0 |
| 7.96 | 99.2 |
| 9.80 | 3.2 |
| 11.28 | 3.9 |
| 13.20 | 3.7 |
| 13.47 | 4.0 |
| 15.69 | 8.6 |
| 15.92 | 8.2 |
| 16.87 | 5.3 |
| 18.67 | 6.4 |
| 19.49 | 9.5 |
| 20.66 | 8.2 |
| 22.20 | 6.6 |
| 23.55 | 10.0 |
| 23.94 | 2.3 |
| 26.09 | 8.1 |
| 29.34 | 4.2 |
| 32.41 | 4.0 |
| 34.49 | 4.2 |

The remainder of the above-mentioned product (3.5 g) was heated to 120° C. in 1 h and held at that temperature for 15 h, and subsequently calcined by heating to 500° C. in 7 h and maintaining said temperature for 15 h, thus affording 1.3 g of a white powder.

The calcined synthesis product had the reflections shown in Table 11 in the X-ray diffraction pattern (Cu K alpha 1).

TABLE 11

X-ray diffraction pattern of the novel pillared silicate after calcination

| Diffraction angle 2θ/° [Cu K(alpha 1)] | Intensity (%) |
|---|---|
| 7.86 | 99.5 |
| 7.93 | 100.0 |
| 11.30 | 2.0 |
| 13.46 | 2.1 |
| 15.64 | 6.6 |
| 15.84 | 6.6 |
| 19.50 | 4.9 |
| 20.63 | 4.0 |
| 23.51 | 6.9 |
| 23.92 | 9.4 |
| 26.01 | 4.0 |

Example 12

Preparation of a Pillared BLS-1 Silicate Using Dichlorodimethylsilane 50.2 g of 1 M hydrochloric acid and 2.8 g of BLS-1 from Example 5 were added to 116.5 g of distilled water and the resulting was stirred for 5 min. 0.6 g of dichlorodimethylsilane were then added and the solution was stirred for 15 min. The mixture was then transferred to a pressure digestion vessel and then heated therein under hydrothermal conditions at 170° C. for 24 h, thus affording a clear solution containing a white precipitate. The solid reaction product was then separated by suction filtration, first washed with the filtrate and then with 2 liters of distilled water to pH=7 of the washing solution. The product was then heated to 120° C. in 1 h and held at that temperature for 15 h. The product thus obtained was then calcined by heating to 500° C. in 7 h and maintaining said temperature for 15 h, thus affording 2.0 g of a white powder.

The synthesis product had the reflections shown in Table 12 in the X-ray diffraction pattern (Cu K alpha 1).

TABLE 12

X-ray diffraction pattern of the novel pillared silicate

| Diffraction angle 2θ/° [Cu K(alpha 1)] | Intensity (%) |
|---|---|
| 7.58 | 100.0 |
| 12.61 | 6.8 |
| 14.01 | 3.8 |
| 14.75 | 3.2 |
| 15.14 | 2.9 |
| 16.45 | 4.4 |
| 17.78 | 3.9 |
| 19.82 | 7.9 |
| 20.88 | 5.3 |
| 22.87 | 15.8 |
| 23.78 | 14.2 |
| 24.45 | 8.2 |
| 25.43 | 11.4 |
| 25.90 | 9.2 |
| 26.21 | 10.4 |
| 26.57 | 7.2 |
| 28.48 | 5.4 |
| 29.17 | 5.1 |
| 29.83 | 5.0 |
| 31.81 | 4.0 |
| 34.44 | 3.6 |
| 35.59 | 3.4 |
| 36.53 | 3.5 |
| 38.80 | 3.2 |
| 41.71 | 3.1 |
| 43.45 | 4.0 |
| 44.20 | 3.9 |
| 47.05 | 3.9 |
| 48.09 | 3.8 |
| 49.33 | 3.9 |

Measurement with Nitrogen

A pulverulent, freshly calcined sample of the tectosilicate obtained according to example 14 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 14A:
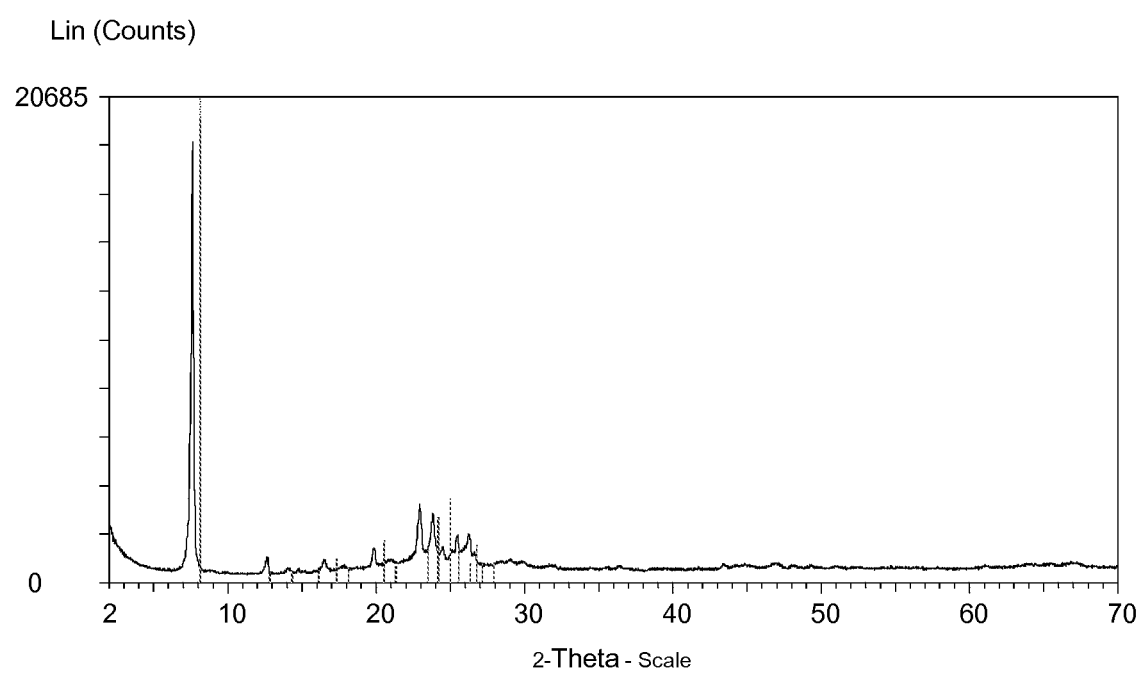
Figure 14B:
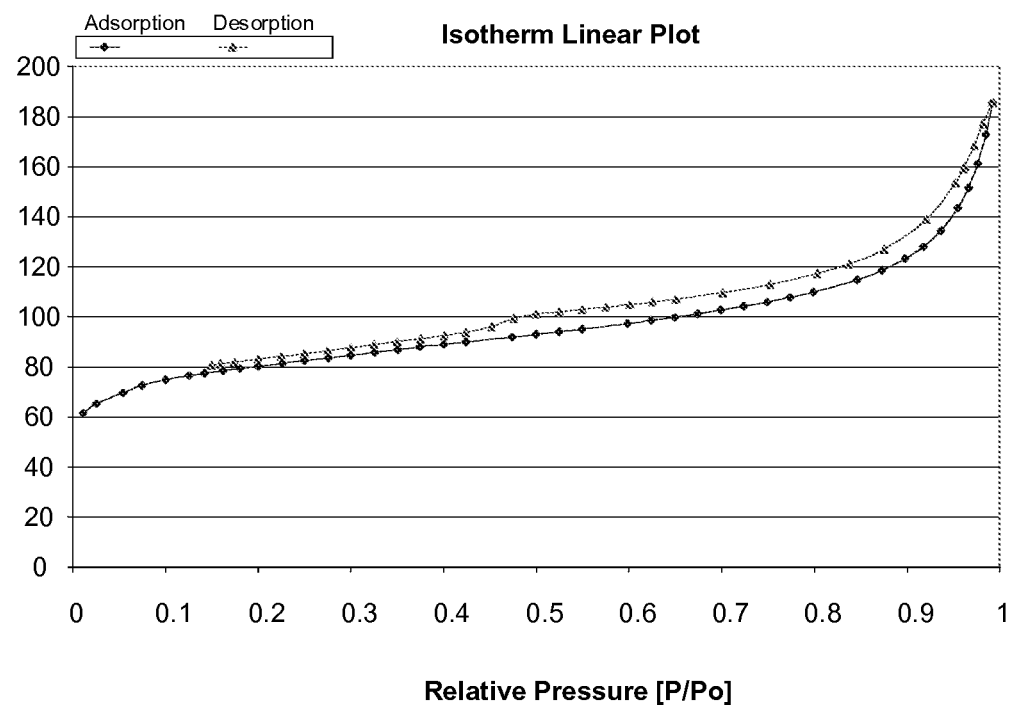

FIG. 14*b* shows the isotherm obtained. The step-like curve of a type I adsorption isotherm typical of microporous solids is evident (cf. DIN 66135). The evaluation of the data gave an equivalent surface of 373.11 $m^2/g$ according to the Langmuir method, and a BET surface area of 282.97 $m^2/g$.

Example 13

Preparation of a Pillared BLS-1 Silicate Using Chlorotriethylsilane 50.1 g of 1 M hydrochloric acid and 2.8 g of BLS-1 from Example 5 were added to 116.4 g of distilled water and the resulting was stirred for 5 min. 0.7 g of chlorotriethylsilane were then added and the solution was stirred for 15 min.

The mixture was then transferred to a pressure digestion vessel and then heated therein under hydrothermal conditions at 170° C. for 24 h, thus affording solution containing a pasty white solid.

The solid reaction product was then separated by suction filtration, first washed with the filtrate and then with 2 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.0 g of a white powder.

The synthesis product had the reflections shown in Table 13 in the X-ray diffraction pattern (Cu K alpha 1).

TABLE 13

X-ray diffraction pattern of the novel pillared silicate

| Diffraction angle 2θ/° [Cu K(alpha 1)] | Intensity (%) |
|---|---|
| 7.60 | 100.0 |
| 8.77 | 2.7 |
| 12.60 | 5.4 |
| 14.02 | 2.5 |
| 14.75 | 2.2 |
| 15.20 | 2.2 |
| 16.49 | 3.4 |
| 17.81 | 2.9 |
| 19.80 | 6.8 |
| 20.85 | 4.3 |
| 22.92 | 12.1 |
| 23.85 | 8.2 |
| 24.43 | 6.0 |
| 25.39 | 8.9 |
| 25.97 | 7.8 |
| 26.25 | 7.7 |
| 26.55 | 6.2 |
| 28.52 | 4.1 |
| 29.34 | 3.8 |
| 29.91 | 3.4 |

Measurement with Nitrogen

A pulverulent, freshly calcined sample of the tectosilicate obtained according to example 15 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 15:
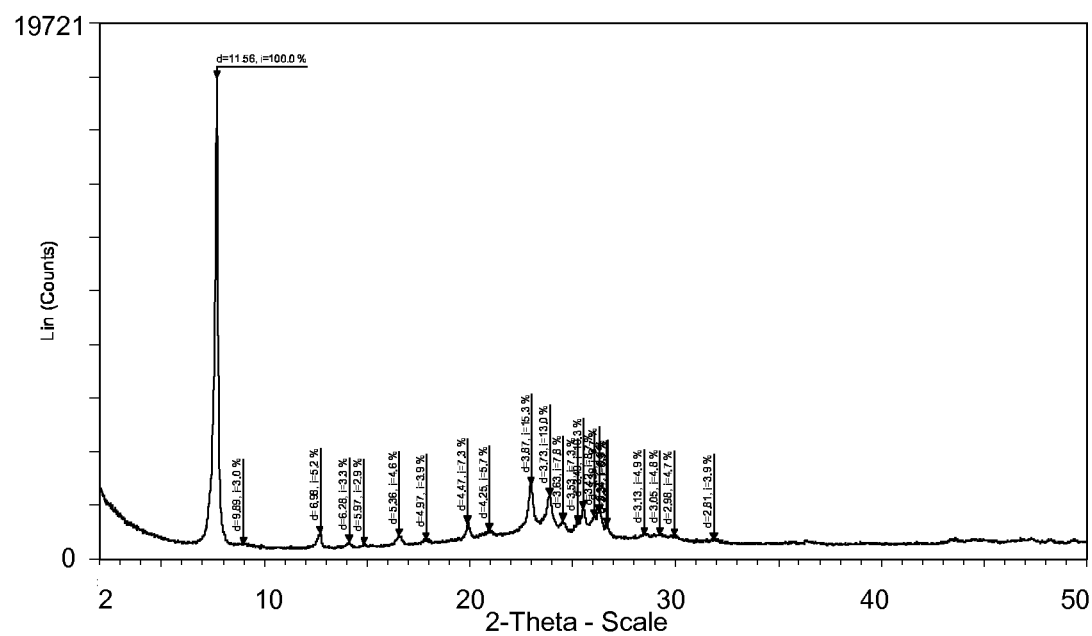
FIGS. 15, 16, and 17*a* shows the X-ray diffraction patterns of the pillared silicate obtained according to Examples 15, 16, and 17, respectively.

FIG. 15b shows the isotherm obtained. The step-like curve of a type I adsorption isotherm typical of microporous solids is evident (cf. DIN 66135). The evaluation of the data gave an equivalent surface of 452.69 m²/g according to the Langmuir method, and a BET surface area of 344.53 m²/g.

Example 14

Preparation of a Pillared BLS-1 Silicate Using Triethylsilane 50.2 g of 1 M hydrochloric acid and 2.8 g of BLS-1 from Example 5 were added to 116.6 g of distilled water and the resulting was stirred for 5 min. 0.4 g of triethylsilane were then added and the solution was stirred for 15 min.

The mixture was then transferred to a pressure digestion vessel and then heated therein under hydrothermal conditions at 170° C. for 24 h, thus affording a solution containing a pasty white solid.

The solid reaction product was then separated by suction filtration, first washed with the filtrate and then with 2 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 1.9 g of a white powder.

The synthesis product had the reflections shown in Table 14 in the X-ray diffraction pattern (Cu K alpha 1).

TABLE 14

X-ray diffraction pattern of the novel pillared silicate

| Diffraction angle 2θ/° [Cu K(alpha 1)] | Intensity (%) |
|---|---|
| 7.60 | 100.0 |
| 8.88 | 2.6 |
| 12.42 | 3.3 |
| 12.52 | 4.5 |
| 12.64 | 5.6 |
| 14.00 | 3.3 |
| 14.18 | 2.7 |
| 14.74 | 3.0 |
| 15.17 | 2.3 |
| 16.45 | 4.9 |
| 17.77 | 3.7 |
| 19.84 | 7.5 |
| 20.52 | 4.7 |
| 20.97 | 5.0 |
| 22.91 | 18.0 |
| 23.79 | 15.4 |
| 24.44 | 7.8 |
| 25.09 | 7.0 |
| 25.45 | 10.6 |
| 25.98 | 7.9 |
| 26.22 | 10.9 |
| 26.59 | 6.6 |
| 26.59 | 6.6 |
| 28.42 | 4.7 |
| 29.02 | 5.1 |
| 29.86 | 4.5 |
| 31.65 | 3.9 |

Measurement with Nitrogen

A pulverulent, freshly calcined sample of the tectosilicate obtained according to example 16 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 16:
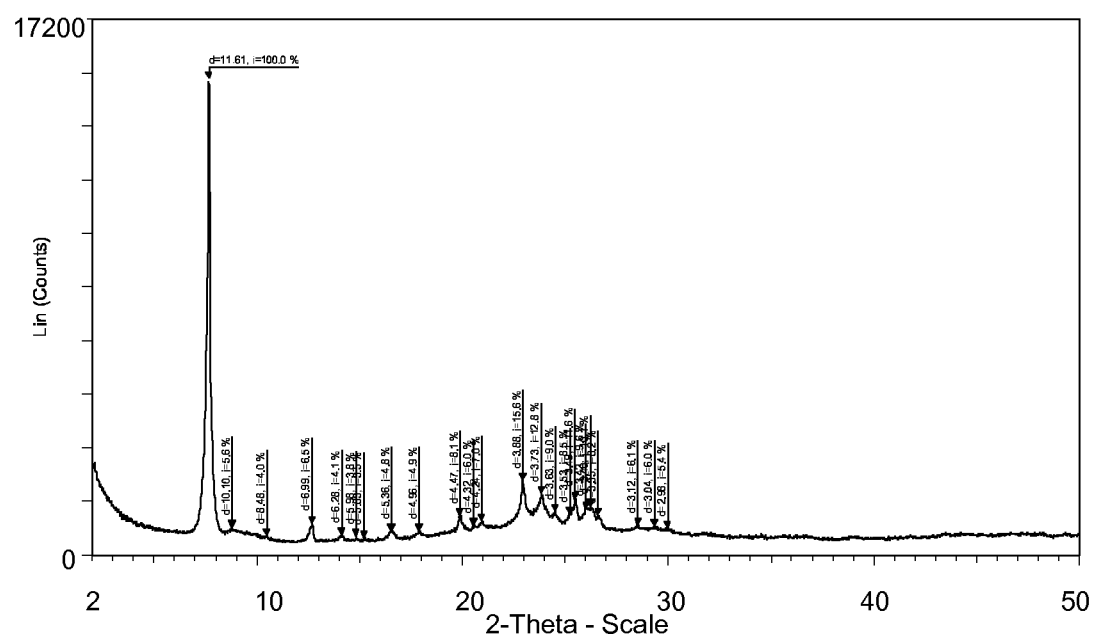
Figure 17A:
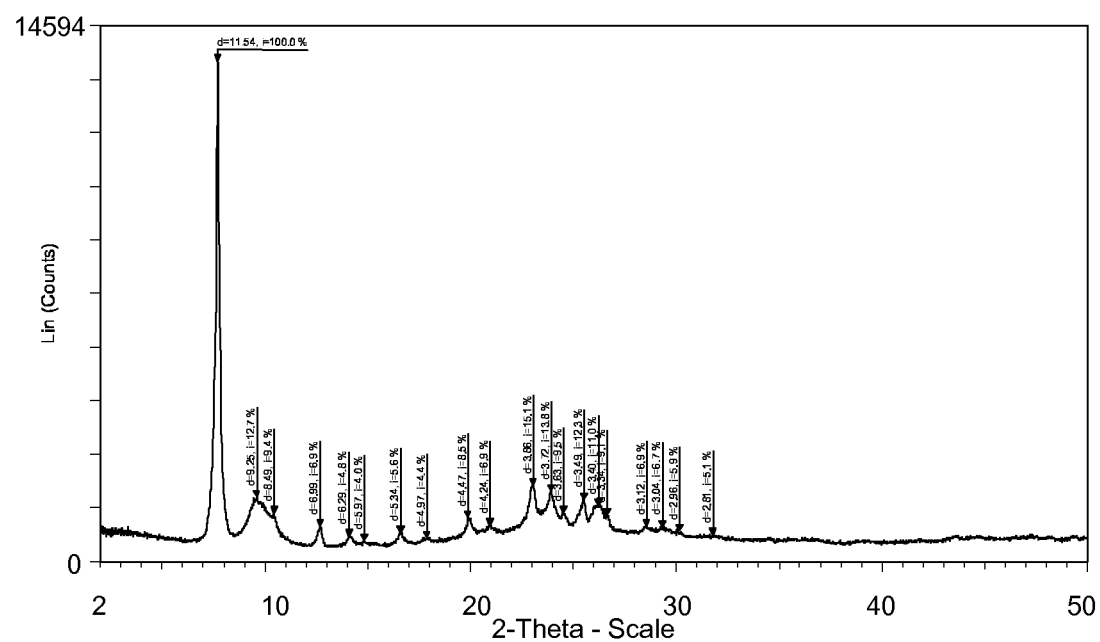
Figure 17B:
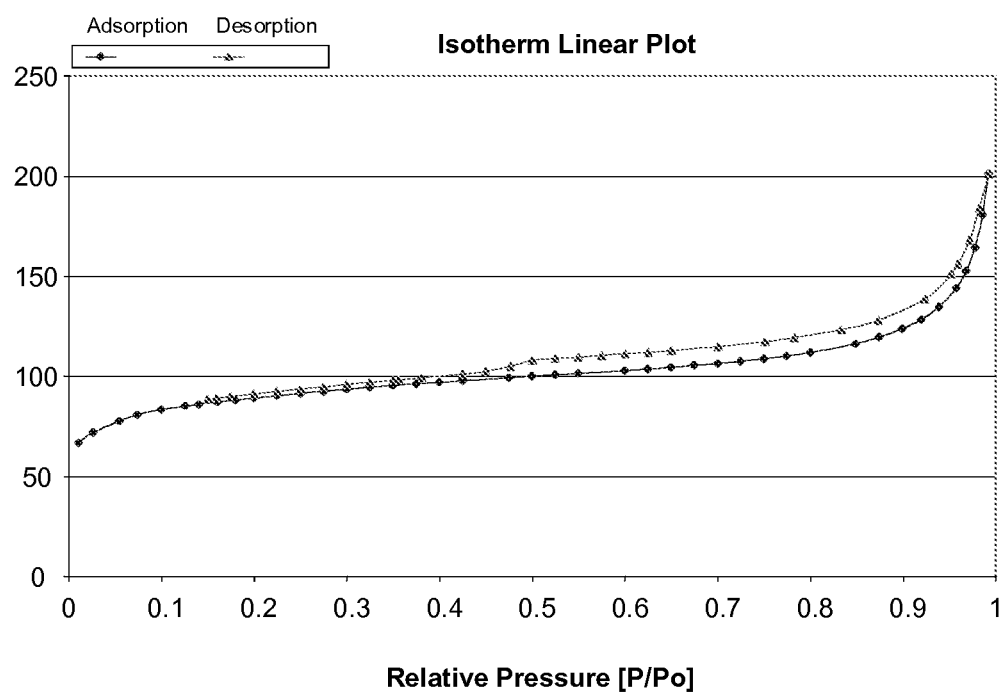

FIG. 16b shows the isotherm obtained. The step-like curve of a type I adsorption isotherm typical of microporous solids is evident (cf. DIN 66135). The evaluation of the data gave an equivalent surface of 369.67 m²/g according to the Langmuir method, and a BET surface area of 278.29 m²/g.

Example 15

Preparation of a Pillared BLS-1 Silicate Using Chlorotrimethylsilane 50.2 g of 1 M hydrochloric acid and 2.8 g of BLS-1 from Example 5 were added to 116.5 g of distilled water and the resulting was stirred for 5 min. 0.5 g of chlorotrimethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 3 liters of distilled water to pH=7 of the washing solution. The product was then heated to 120° C. in 1 h and held at that temperature for 15 h. The product thus obtained was then calcined by heating to 500° C. in 7 h and maintaining said temperature for 15 h, thus affording 2.1 g of a white powder.

The synthesis product had the reflections shown in Table 15 in the X-ray diffraction pattern (Cu K alpha 1).

TABLE 15

X-ray diffraction pattern of the novel pillared silicate

| Diffraction angle 2θ/° [Cu K(alpha 1)] | Intensity (%) |
|---|---|
| 7.64 | 100.0 |
| 8.93 | 3.0 |
| 12.67 | 5.2 |
| 14.09 | 3.3 |
| 14.82 | 2.9 |
| 16.53 | 4.6 |
| 17.84 | 3.9 |
| 19.86 | 7.3 |
| 20.91 | 5.7 |
| 22.95 | 15.3 |
| 23.86 | 13.0 |
| 24.51 | 7.8 |
| 25.23 | 7.3 |
| 25.50 | 10.3 |
| 26.01 | 8.7 |
| 26.27 | 9.7 |
| 26.66 | 6.9 |
| 26.65 | 6.9 |
| 28.47 | 4.9 |
| 29.24 | 4.8 |
| 29.95 | 4.7 |
| 31.87 | 3.9 |

Example 16

Preparation of a Pillared BLS-1 Silicate Using Ethoxytrimethylsilane 50.2 g of 1 M hydrochloric acid and 2.8 g of BLS-1 from Example 5 were added to 116.5 g of distilled water and the resulting was stirred for 5 min. 0.5 g of ethoxytrimethylsilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 3 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.2 g of a white powder.

The synthesis product had the reflections shown in Table 16 in the X-ray diffraction pattern (Cu K alpha 1).

TABLE 16

X-ray diffraction pattern of the novel pillared silicate

| Diffraction angle 2θ/° [Cu K(alpha 1)] | Intensity (%) |
|---|---|
| 7.61 | 100.0 |
| 8.75 | 5.6 |
| 10.43 | 4.0 |
| 12.66 | 6.5 |
| 14.09 | 4.1 |
| 14.79 | 3.8 |
| 15.19 | 3.5 |
| 16.51 | 4.8 |
| 17.86 | 4.9 |
| 19.85 | 8.1 |
| 20.53 | 6.0 |
| 20.91 | 7.0 |
| 22.93 | 15.6 |
| 23.85 | 12.8 |
| 24.50 | 9.0 |
| 25.23 | 8.5 |
| 25.49 | 11.6 |
| 26.01 | 9.6 |
| 26.22 | 10.1 |
| 26.61 | 8.2 |
| 28.55 | 6.1 |
| 29.35 | 6.0 |
| 29.98 | 5.4 |

Example 17

Preparation of a Pillared BLS-1 Silicate Using Hexamethyldisilane 50.2 g of 1 M hydrochloric acid and 2.8 g of BLS-1 from Example 5 were added to 116.4 g of distilled water and the resulting was stirred for 5 min. 0.7 g of hexamethyldisilane were then added and the solution was stirred for 15 min.

The mixture was then transferred to a pressure digestion vessel and then heated therein under hydrothermal conditions at 170° C. for 24 h, thus affording a clear solution containing a white precipitate.

The solid reaction product was then separated by suction filtration, first washed with the filtrate and then with 2 liters of distilled water to pH=7 of the washing solution. The product was then heated to 120° C. in 1 h and held at that temperature for 15 h.

The product thus obtained was then calcined by heating to 500° C. in 7 h and maintaining said temperature for 15 h, thus affording 2.0 g of a white powder.

The synthesis product had the reflections shown in Table 17 in the X-ray diffraction pattern (Cu K alpha 1).

TABLE 17

X-ray diffraction pattern of the novel pillared silicate

| Diffraction angle 2θ/° [Cu K(alpha 1)] | Intensity (%) |
|---|---|
| 7.66 | 100.0 |
| 9.55 | 12.7 |
| 10.41 | 9.4 |
| 12.65 | 6.9 |
| 14.08 | 4.8 |
| 14.82 | 4.0 |
| 16.59 | 5.6 |
| 17.84 | 4.4 |
| 19.84 | 8.5 |
| 20.93 | 6.9 |
| 23.03 | 15.1 |
| 23.91 | 13.8 |
| 24.52 | 9.5 |
| 25.52 | 12.3 |
| 26.21 | 11.0 |
| 26.64 | 9.1 |
| 28.55 | 6.9 |
| 29.35 | 6.7 |
| 30.18 | 5.9 |
| 31.80 | 5.1 |

Measurement with Nitrogen

A pulverulent, freshly calcined sample of the tectosilicate obtained according to example 19 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

FIG. 19b shows the isotherm obtained. The step-like curve of a type I adsorption isotherm typical of microporous solids is evident (cf. DIN 66135). The evaluation of the data gave an equivalent surface of 410.20 m²/g according to the Langmuir method, and a BET surface area of 309.40 m²/g.

The invention claimed is:

1. A process for the preparation of a silicate compound, comprising
   (1) providing at least one layered silicate;
   (2) mixing said layered silicate with water and at least one silicon containing compound according to formula (I)

$$R_{4-m}Si[-(SiR_2)_n-R]_m \quad (I)$$

and
   (3) subjecting the mixture obtained in (2) to hydrothermal conditions to provide a suspension comprising a silicate compound,
   wherein the at least one layered silicate is selected from the group consisting of RUB-15, RUB-36, RUB-39, BLS-1, and BLS-3
   wherein m is 1, 2, 3, or 4; and
   n is an integer greater than or equal to 0;
   wherein when n is equal to 0, at least one residue R is a leaving group,
   wherein none of the residues R contains Si, and
   wherein the hydrothermal treatment of step (3) is carried out under autogenous pressure at a temperature above the boiling point of the solution according to step (2).

2. The process of claim 1, wherein the leaving group is dissociated from the at least one silicon containing compound during the course of step (2) and/or (3).

3. The process of claim 1, wherein R, independently from one another, are selected from the group consisting of $C_1$ to $C_5$ alkyl groups and leaving groups.

4. The process of claim 1, wherein the at least one silicon containing compound according to formula (I) is selected from the group consisting of dichlorodimethylsilane, dimethoxydimethylsilane, diethoxydimethylsilane, dichlorodiethylsilane, dimethoxydiethylsilane, diethoxydiethylsilane, trimethylsilane, triethylsilane, chlorotrimethylsilane, chlorotriethylsilane, methoxytrimethylsilane, methoxytriethylsilane, ethoxytrimethylsilane, ethoxytriethylsilane, and hexamethyldisilane.

5. The process of claim 1, wherein when n is equal to 0, only one residue R is a leaving group.

6. The process of claim 1, wherein n is greater than or equal to 1.

7. The process of claim 6, wherein m is equal to 1.

8. The process of claim 1, wherein the at least one layered silicate is isomorphously substituted.

9. The process of claim 1, wherein in the mixture obtained in (2), the weight ratio of the layered silicate and water (layered silicate : water) is in the range of 1: (20-80).

10. The process of claim 1, wherein in the mixture obtained in (2), the molar ratio of silicon in the at least one silicon containing compound according to formula (I) and water (silicon:water) is in the range of 1: (500-3000).

11. The process of claim 1, wherein the pH of the mixture subjected to hydrothermal treatment in (3) is adjusted to a value in the range of from 0.1 to 5.

12. The process of claim 1, wherein the hydrothermal treatment in step (3) is carried out at a temperature in the range of from 120 to 200° C.

13. The process of claim 1, wherein the temperature of the hydrothermal treatment in step (3) is maintained for a period of from 1 h to 48 h.

14. The process of claim 1 which further comprises
   (4) separating the silicate compound from the suspension obtained according to (3);
   (5) optionally washing the silicate compound obtained from (4) via filtration
   (6) optionally drying the separated and/or optionally washed silicate compound.

15. The process of claim 14 which further comprises
   (7) calcining the separated and/or optionally washed and/or dried product obtained in step (2) or (3) or (4) or (5) or (6).

* * * * *